(12) United States Patent
Matsuzawa

(10) Patent No.: US 10,699,440 B2
(45) Date of Patent: Jun. 30, 2020

(54) CALIBRATION DEVICE, CALIBRATION METHOD, OPTICAL DEVICE, PHOTOGRAPHING DEVICE, PROJECTING DEVICE, MEASUREMENT SYSTEM, AND MEASUREMENT METHOD

(71) Applicant: OLYMPUS CORPORATION, Tokyo (JP)

(72) Inventor: Toshiaki Matsuzawa, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 85 days.

(21) Appl. No.: 16/183,027

(22) Filed: Nov. 7, 2018

(65) Prior Publication Data
US 2019/0073795 A1 Mar. 7, 2019

Related U.S. Application Data

(63) Continuation of application No. PCT/JP2017/017613, filed on May 10, 2017.

(30) Foreign Application Priority Data

May 13, 2016 (JP) .................................. 2016-097370

(51) Int. Cl.
*G06T 7/80* (2017.01)
*G06T 7/60* (2017.01)
*H04N 5/232* (2006.01)

(52) U.S. Cl.
CPC .................. *G06T 7/80* (2017.01); *G06T 7/60* (2013.01); *H04N 5/232* (2013.01)

(58) Field of Classification Search
None
See application file for complete search history.

(56) References Cited

U.S. PATENT DOCUMENTS

| 6,099,134 A | 8/2000 | Taniguchi et al. |
| 8,121,433 B2 * | 2/2012 | Leprince ............... G01C 11/02 342/355 |

(Continued)

FOREIGN PATENT DOCUMENTS

| EP | 1434169 A2 | 6/2004 |
| EP | 3220099 A1 | 9/2017 |

(Continued)

OTHER PUBLICATIONS

International Search Report dated Aug. 8, 2017 issued in PCT/JP2017/017613.

(Continued)

*Primary Examiner* — Fayyaz Alam
(74) *Attorney, Agent, or Firm* — Scully, Scott, Murphy & Presser, P.C.

(57) ABSTRACT

Provided is a calibration device for an optical device including a two-dimensional image conversion element having a plurality of pixels and including an optical system that forms an image-forming relationship between the image conversion element and a three-dimensional world coordinate space, the calibration device including: a computer, wherein the computer is configured to: obtain calibration data representing the correspondence between two-dimensional pixel coordinates of the image conversion element and three-dimensional world coordinates of the world coordinate space; and fit a camera model representing the direction of a principal ray in the world coordinate space, corresponding to the pixel coordinates, as a function of the pixel coordinates, to the calibration data obtained, thereby calculating parameters of the camera model.

20 Claims, 13 Drawing Sheets

(56) References Cited

U.S. PATENT DOCUMENTS

| | | | |
|---|---|---|---|
| 9,784,576 B2* | 10/2017 | Chang | G01C 3/08 |
| 2004/0170315 A1 | 9/2004 | Kosaka et al. | |
| 2012/0300044 A1 | 11/2012 | Thomas et al. | |
| 2014/0085409 A1 | 3/2014 | Zhang et al. | |
| 2017/0180644 A1* | 6/2017 | Alibay | H04N 5/145 |
| 2017/0221226 A1* | 8/2017 | Shen | G06T 7/80 |
| 2017/0243374 A1 | 8/2017 | Matsuzawa | |

FOREIGN PATENT DOCUMENTS

| | | |
|---|---|---|
| JP | H10-153779 A | 6/1998 |
| JP | 2002-202122 A | 7/2002 |
| JP | 3735344 B2 | 1/2006 |
| JP | 2011-101265 A | 5/2011 |
| JP | 2014-522591 A | 9/2014 |
| WO | WO 2012/162566 | 11/2012 |
| WO | WO 2016/076400 A1 | 5/2016 |

OTHER PUBLICATIONS

"Digital Image Processing, Revised New Version", Computer GraphicArts Society (Mar. 9, 2015), ISBN:978-4-903474-50-2C3004, pp. 308-317, with partial translation.

Brown, D.C., "Close-Range Camera Calibration", Photogramm Eng (1971), pp. 855-866, cited in spec on p. 6.

Bradski, G. et al., "Learning OpenCV", (Sep. 2008), ISBN:978-0-596-51613-0, O'Reilly Media, CA, U.S.A., pp. 319-321.

Tsuruta, Tadao, "Pencil of Rays, Part 2, Applied Optics for Optics Engineers", (Sep. 15, 1988), Shin-Gijutsu Communications, ISBN: 4-915851-02-8, pp. 84-94, with partial translation.

\* cited by examiner

CALIBRATION DEVICE, CALIBRATION METHOD, OPTICAL DEVICE, PHOTOGRAPHING DEVICE, PROJECTING DEVICE, MEASUREMENT SYSTEM, AND MEASUREMENT METHOD

CROSS-REFERENCE TO RELATED APPLICATIONS

This is a continuation of International Application PCT/JP2017/017613, with an international filing date of May 10, 2017, which is hereby incorporated by reference herein in its entirety.

This application is based on Japanese Patent Application No. 2016-097370, the contents of which are incorporated herein by reference.

TECHNICAL FIELD

The present invention relates to calibration devices, calibration methods, optical devices, photographing devices, projecting devices, measurement systems, and measurement methods.

BACKGROUND ART

There have hitherto been known calibration devices for performing camera calibration for photographing devices or projecting devices (e.g., see Patent Literature 1 and Non-Patent Literatures 1 and 2). A camera model includes a plurality of unknown parameters (camera parameters). By obtaining camera parameters in advance by using a calibration device, it is possible to mathematically obtain principal rays in the real world, corresponding to two-dimensional coordinates (pixel coordinates) of an image. The principal rays are also called back-projected straight lines or lines of sight corresponding to pixel coordinates.

Here, the conventional camera calibration disclosed in Patent Literature 1 and Non-Patent Literature 1 will be described. Camera calibration is performed by the following procedure by using a mathematical camera model representing a process of capturing an image of three-dimensional coordinates in the real world with a camera and then transforming the three-dimensional coordinates into two-dimensional coordinates of an image. First, three-dimensional coordinates in the real world (hereinafter referred to as world coordinates) $(x, y, z)$ are projected to normalized image-surface coordinates $(u_p, v_p)$ by using Eq. 1.

$$\begin{cases} u_p = \dfrac{r_{11}x + r_{12}y + r_{13}z + t_x}{r_{31}x + r_{32}y + r_{33}z + t_z} \\ v_p = \dfrac{r_{21}x + r_{22}y + r_{23}z + t_y}{r_{31}x + r_{32}y + r_{33}z + t_z} \end{cases} \quad \{\text{Eq. 1}\}$$

$$R = \begin{pmatrix} r_{11} & r_{12} & r_{13} \\ r_{21} & r_{22} & r_{23} \\ r_{31} & r_{32} & r_{33} \end{pmatrix}, T = \begin{pmatrix} t_x \\ t_y \\ t_z \end{pmatrix} \quad \{\text{Eq. 2}\}$$

Note that a rotation matrix R and a translation vector T in Eq. 2 represent three-dimensional coordinate transformation from the world coordinates to the camera coordinates. These are values representing the position and orientation of the camera in relation to the world coordinates and are referred to as external parameters.

Note that Eq. 1 is based on the assumption that all principal rays intersect at the optical center of the camera. Then, $(u_d, v_d)$, which is the normalized image-surface coordinates $(u_p, v_p)$ with distortion aberration added thereto, is obtained.

$$\begin{cases} u_d = u_p + g_1(u_p^2 + v_p^2) + g_3 u_p^2 + g_4 u_p v_p + k_1 u_p(u_p^2 + v_p^2) \\ v_d = v_p + g_2(u_p^2 + v_p^2) + g_3 u_p v_p + g_4 v_p^2 + k_1 v_p(u_p^2 + v_p^2) \end{cases} \quad \{\text{Eq. 3}\}$$

Here, $(g_1, g_2, g_3, g_4, k_1)$ are distortion parameters. Furthermore, by using Eq. 4, $(u_d, v_d)$, which is the normalized image-surface coordinates with the distortion aberration added thereto, is transformed into per-pixel pixel coordinates $(u, v)$.

$$\begin{cases} u = \alpha_u u_d + u_0 \\ v = \alpha_v v_d + v_0 \end{cases} \quad \{\text{Eq. 4}\}$$

In the standard camera model, transformation from the world coordinates $(x, y, z)$ to the pixel coordinates $(u, v)$, associated with image capturing by means of a camera, is expressed by Eqs. 1 to 4, as described above. Note that the parameters $(\alpha_u, \alpha_v, u_0, v_0, g_1, g_2, g_3, g_4, k_1)$ in Eqs. 3 and 4 represent the characteristics of the camera itself and are thus referred to as internal parameters.

Distortion parameters are defined in various ways depending on the application. For example, Eq. 3 is a model in which distortion aberrations of not higher than the third order are taken into consideration; however, models in which higher-order terms are further added, like the fifth order, the seventh order, and so forth, are also used. The representative distortion model among these models is the Brown model of Non-Patent Literature 2, expressed in Eq. 5.

$$\begin{pmatrix} u_d \\ v_d \end{pmatrix} = \begin{pmatrix} u_p \\ v_p \end{pmatrix} + (k_1 r_p^2 + k_2 r_p^4 + k_3 r_p^6 + \dots)\begin{pmatrix} u_p \\ v_p \end{pmatrix} + \left[p_1\begin{pmatrix} \rho_p^2 + 2u_p^2 \\ 2u_p v_p \end{pmatrix} + p_2\begin{pmatrix} 2u_p v_p \\ \rho_p^2 + 2v_p^2 \end{pmatrix}\right](1 + p_3 \rho_p^2 + \dots) \quad \{\text{Eq. 5}\}$$

where $\rho_p^2 = u_p^2 + v_p^2$

In the Brown model, distortion aberrations are expressed by using parameters $(k_1, k_2, k_3, \dots)$ of rotationally symmetric movement-radius distortion and parameters $(p_1, p_2, p_3, \dots)$ of rotationally asymmetric tangential distortion.

Generally, in camera calibration, an image of a calibration chart with which the world coordinates $(x, y, z)$ include a plurality of known feature points is captured by means of a camera. Then, pixel coordinates $(u, v)$ at which the feature points were captured in the image are obtained through image processing. Camera parameters are obtained by obtaining a plurality of measurement data representing the correspondence between world coordinates $(x, y, z)$ and pixel coordinates $(u, v)$ in this manner.

CITATION LIST

Patent Literature

{PTL 1}
Publication of Japanese Patent No. 3735344

Non Patent Literature

{NPL 1}
DIGITAL IMAGE PROCESSING [Revised Edition] (Computer Graphic Arts Society, 2015)
{NPL 2}
D. C. Brown, "Close-range camera calibration", Photogramm. Eng. 37, 855-866 (1971)

SUMMARY OF INVENTION

One aspect of the present invention provides a calibration device for an optical device including a two-dimensional image conversion element having a plurality of pixels and including an optical system that forms an image-forming relationship between the image conversion element and a three-dimensional world coordinate space, the calibration device including a calibration-data obtaining unit that obtains calibration data representing the correspondence between two-dimensional pixel coordinates of the image conversion element and three-dimensional world coordinates of the world coordinate space; and a parameter calculating unit that fits a camera model representing the direction of a principal ray in the world coordinate space, corresponding to the pixel coordinates, as a function of the pixel coordinates, to the calibration data obtained by the calibration-data obtaining unit, thereby calculating parameters of the camera model.

Another aspect of the present invention provides an optical device having installed therein the camera model in which the parameters calculated by one of the calibration devices described above.

Another aspect of the present invention provides an optical device having installed therein a camera model in which the rotation angles obtained by the calibration device described above are set as camera parameters.

Furthermore, another aspect of the present invention provides an optical device having installed therein a camera model in which the translation components obtained by the calibration device described above are set as camera parameters.

Another aspect of the present invention provides a photographing device constituted of one of the optical devices described above.

Another aspect of the present invention provides a projecting device constituted of one of the optical devices described above.

Another aspect of the present invention provides a measurement system including the calibration device described above; one or more photographing devices; and a three-dimensional-coordinate calculation processing unit that calculates three-dimensional coordinates of a point of interest of an object from pixel coordinates of images acquired by the photographing devices from a plurality of viewpoints, wherein the three-dimensional-coordinate calculation processing unit uses the camera model used in the calibration device, the parameters of the camera models of the photographing devices, calculated by the calibration device, and rotation angles and/or translation components of the photographing devices.

Another aspect of the present invention provides a measurement system including the calibration device described above; one or more photographing devices; one or more projecting devices; and a three-dimensional-coordinate calculation processing unit that calculates three-dimensional coordinates of a point of interest of an object onto which structured light from the projecting devices is projected, from pixel coordinates of images of the object captured by the photographing devices, wherein the three-dimensional-coordinate calculation processing unit uses the camera model used in the calibration device, the parameters of the camera models of the photographing devices, calculated by the calibration device, rotation angles and/or translation components of the photographing devices, the parameters of the camera models of the projecting devices, calculated by the calibration device, and rotation angles and/or translation components of the projecting devices.

Another aspect of the present invention provides a calibration method including a step of obtaining calibration data for an optical device including a two-dimensional image conversion element having a plurality of pixels and including an optical system that forms an image-forming relationship between the image conversion element and a three-dimensional world coordinate space, the calibration data representing the correspondence between two-dimensional pixel coordinates of the image conversion element and three-dimensional world coordinates of the world coordinate space; and a step of fitting, on the basis of the obtained calibration data, a camera model representing, as a function of the pixel coordinates, the direction of a principal ray in the world coordinate space, corresponding to the pixel coordinates, thereby calculating parameters of the camera model.

Another aspect of the present invention provides a measurement method including a step of obtaining calibration data for a photographing device including a two-dimensional image conversion element having a plurality of pixels and including an optical system that forms an image-forming relationship between the image conversion element and a three-dimensional world coordinate space, the calibration data representing the correspondence between two-dimensional pixel coordinates of the image conversion element and three-dimensional world coordinates of the world coordinate space; a step of fitting, on the basis of the obtained calibration data, a camera model representing, as a function of the pixel coordinates, the direction of a principal ray in the world coordinate space, corresponding to the pixel coordinates, thereby calculating parameters of the camera model; and a step of calculating three-dimensional coordinates of a point of interest of an object from pixel coordinates of images from a plurality of viewpoints by using the calculated parameters, the camera model used to calculate the parameters, and rotation angles and/or translation components of the photographing device.

Another aspect of the present invention provides a measurement method including a step of obtaining calibration data for a photographing device and a projecting device each including a two-dimensional image conversion element having a plurality of pixels and including an optical system that forms an image-forming relationship between the image conversion element and a three-dimensional world coordinate space, the calibration data representing the correspondence between two-dimensional pixel coordinates of the image conversion element and three-dimensional world coordinates of the world coordinate space; a step of fitting, on the basis of the obtained calibration data, a camera model representing, as a function of the pixel coordinates, the direction of a principal ray in the world coordinate space, corresponding to the pixel coordinates, thereby calculating parameters of the camera model; and a step of calculating three-dimensional coordinates of a point of interest of an object from pixel coordinates of images from pixel coordinates from a plurality of viewpoints in images, captured by the photographing device, of the object onto which structured light from the projecting device is projected, by using the calculated parameters, the camera model used to calculate the parameters, and rotation angles and/or translation components of the photographing

DESCRIPTION OF EMBODIMENTS

A calibration device and a camera calibration method according to a first embodiment of the present invention will be described below with reference to the drawings.

The calibration device according to this embodiment is a camera calibration device 1 for calibrating a camera (photographing device or optical device) 2 that transfers captured images to the outside as image files in a predetermined format. The camera 2 is used as an example of an optical device in this embodiment.

Figure 1:
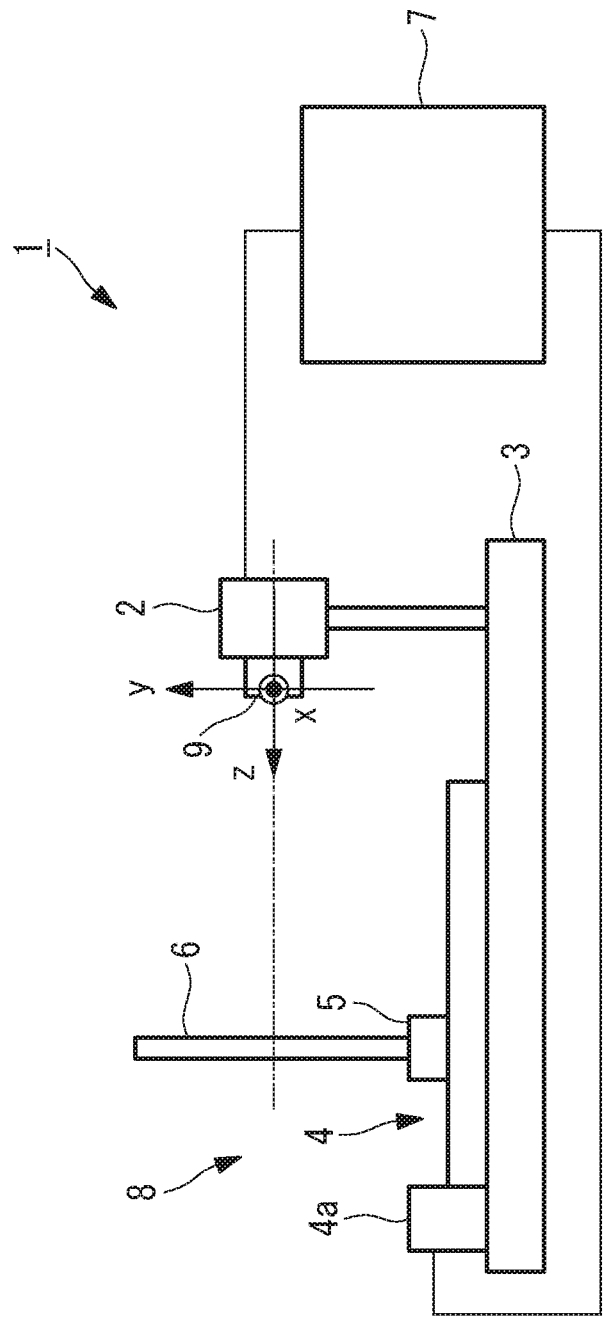
FIG. 1 is an overall configuration diagram schematically showing a calibration device according to a first embodiment of the present invention.

As shown in FIG. 1, the camera calibration device 1 according to this embodiment includes a base 3 to which the camera 2 to be calibrated is secured; a z-axis moving stage 4 provided on the base 3; a calibration chart 6 fixed to a movable part 5 that is moved by the z-axis moving stage 4; and a computer 7 connected to the camera 2 and the z-axis moving stage 4. The three-dimensional coordinate axes of the camera calibration device 1 are defined as shown in FIG. 1. The base 3 to which the camera 2 is secured, the calibration chart 6, and the z-axis moving stage 4 constitute a calibration-data acquisition unit 8.

The z-axis moving stage 4 is a linear driving mechanism that is driven by a motor $4a$ to linearly move the movable part 5. In the camera calibration device 1, the moving direction of the movable part 5 is defined as the z axis, and the horizontal direction and the vertical direction in a plane perpendicular to the z axis are defined as the x axis and the y axis.

In this embodiment, the position of the coordinate origin is defined in the vicinity of the entrance pupil of a camera lens 9.

The camera 2 is attached to the base 3 such that the optical axis thereof is parallel to the z axis, such that the horizontal direction and the vertical direction of the imaging surface thereof are parallel to the x axis and the y axis, respectively, and such that the coordinate origin coincides with a predetermined position of the camera 2.

Figure 2:
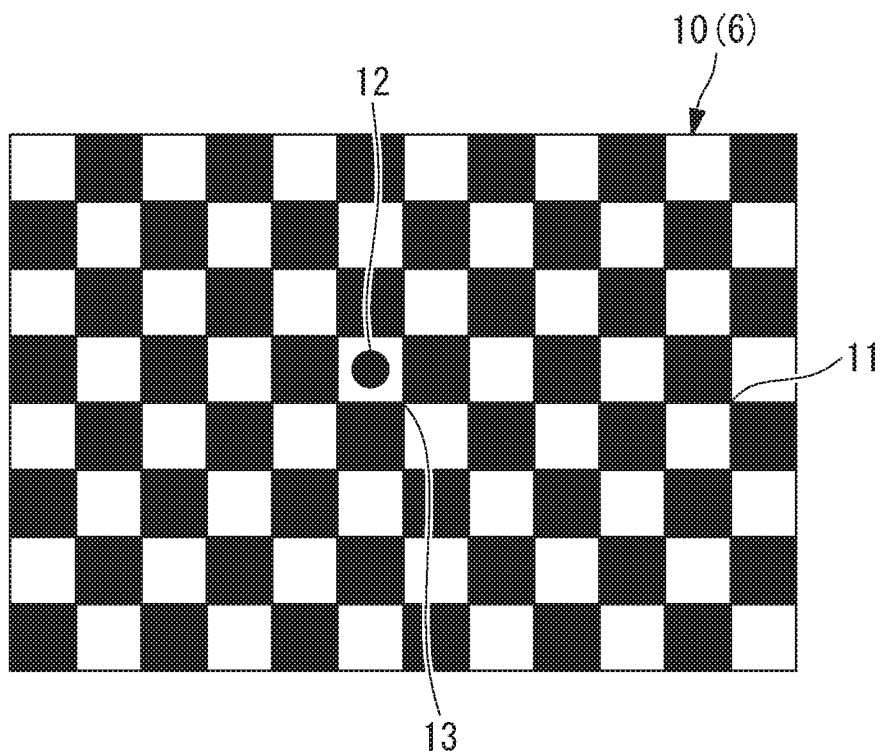
FIG. 2 is an illustration showing the pattern of a calibration chart of the calibration device in FIG. 1.

The calibration chart 6 is a chessboard 10 in FIG. 2, which is widely used for camera calibration. The calibration chart 6 is fixed to the movable part 5 so as to squarely face the camera 2 secured to the base 3, i.e., so as to be disposed in a plane perpendicular to the z axis. The calibration chart 6 may be any kind of chart including a plurality of feature points.

The calibration chart 6 is configured so as to be movable to arbitrary points in the z-axis direction by the z-axis moving stage 4. The movable range of the movable part 5 of the z-axis moving stage 4 encompasses the range of object distances (=distance between the camera 2 and the imaging target) requiring camera calibration.

The computer 7 works to control imaging by the camera 2 so as to read captured images as image files in a predetermined format. Furthermore, the computer 7 works to control the z-axis moving stage 4 so as to move the calibration chart 6 to a certain position in the z-axis direction. Furthermore, the computer 7 also works as a parameter calculating unit that calculates camera parameters by fitting a camera model to acquired configuration data.

Here, the chessboard 10 used as the calibration chart 6 will be described with reference to FIG. 2.

The chessboard 10 is a flat plate-shaped member having a checkerboard pattern in which black and white squares are arrayed on a plane so as to form a square lattice, and the intersections corresponding to the vertices of the individual squares are utilized as feature points for camera calibration (the feature points will hereinafter be referred to as lattice points 11).

As the chessboard 10, a chessboard with which a number of lattice points 11 sufficient for camera calibration fall within the imaging range of the camera 2 is used. Although the imaged range of the chessboard 10 varies depending on the object distance, preferably, at least about 10×10 lattice points 11 should be imaged at each object distance. Furthermore, a reference position mark 12 is provided in the vicinity of the center of the calibration chart 6 in order to define correspondence between the pixel coordinates of the imaged lattice points 11 and the world coordinates of the lattice points 11 on the calibration chart 6.

The chessboard 10 is installed on the camera calibration device 1 such that the lattice point nearest to the lower right side of the reference position mark 12 (a center lattice point 13) is located on the z axis and such that the vertical and horizontal directions of the chessboard 10 become parallel to the x axis and the y axis, respectively. Thus, the world coordinates (x, y, z) of the individual lattice points 11 and 13 are fixed as known values from the lattice pitch of the square lattice of the chessboard 10 and the moved position of the z-axis moving stage 4.

A camera calibration method performed by using the thus-configured camera calibration device 1 according to this embodiment will be described.

In order to calibrate the camera 2 by using the camera calibration device 1 according to this embodiment, an operator first attaches the camera 2 to be calibrated to the camera calibration device 1 in accordance with the definitions of the coordinate axes, thereby connecting the camera 2 to the computer 7. Then, a measurement program inside the computer 7 is started.

As described below, according to the measurement program, images of the calibration chart 6 at a plurality of object distances are automatically captured by the camera 2, and the pixel coordinates of the lattice points 11 are obtained from those images. The measurement program will be described with reference to a flowchart in FIG. 3.

At the beginning of measurement, first, the z-axis moving stage 4 is moved so as to locate the calibration chart 6 at the end, closer to the camera 2, of the object distance range for calibrating the camera 2 (step S1). Then, an image of the calibration chart 6 is captured by the camera 2, and the resulting image file is transferred to the computer 7 (step S2). Furthermore, these steps S1 and S2 are repeated until imaging is performed a predetermined number of times (step S3). As the predetermined number of times, for example, a number of times greater than or equal to five times is set.

At this time, in step S1, for each iteration, the movable part 5 is moved by the z-axis moving stage 4 such that the object distance from the camera 2 to the calibration chart 6 increases by a predetermined interval. The amounts of movement of the movable part 5 need not be equal intervals, but the calibration chart 6 should preferably be imaged at about five or more points with different object distances within the object distance range for calibrating the camera 2. Furthermore, when the number of captured images has reached the predetermined number, the procedure proceeds to the next step S4.

The plurality of image files transferred to the computer 7 in steps S1 to S3 are subjected to image processing to obtain the pixel coordinates of the individual lattice points 11 within the imaging range, and the pixel coordinates of the center of gravity of the reference position mark 12 in the individual image files are obtained (step S4). The method of obtaining the pixel coordinates of the lattice points 11 on the chessboard 10 by using subpixels is known, and thus a description thereof is omitted here.

Then, the pixel coordinates of the individual lattice points 11, obtained in step S4, are associated with the world coordinates of the lattice points 11 on the calibration chart 6 (step S5). Since the center lattice point 13, which is nearest to the lower right side of the reference position mark 12, is located on the z axis of the world coordinates, as described earlier, it is possible to associate the pixel coordinates of the individual lattice points 11 and 13 with world coordinates with reference to the center lattice point 13. Lastly, all the pixel coordinates and world coordinates that have been associated are written to a measurement data file, whereby the measurement is finished. Through the procedure described above, measurement data needed for the optimization of camera parameters is obtained.

Now, the camera model used in this embodiment will be described with reference to FIGS. 4A to 4C.

Figure 4A:
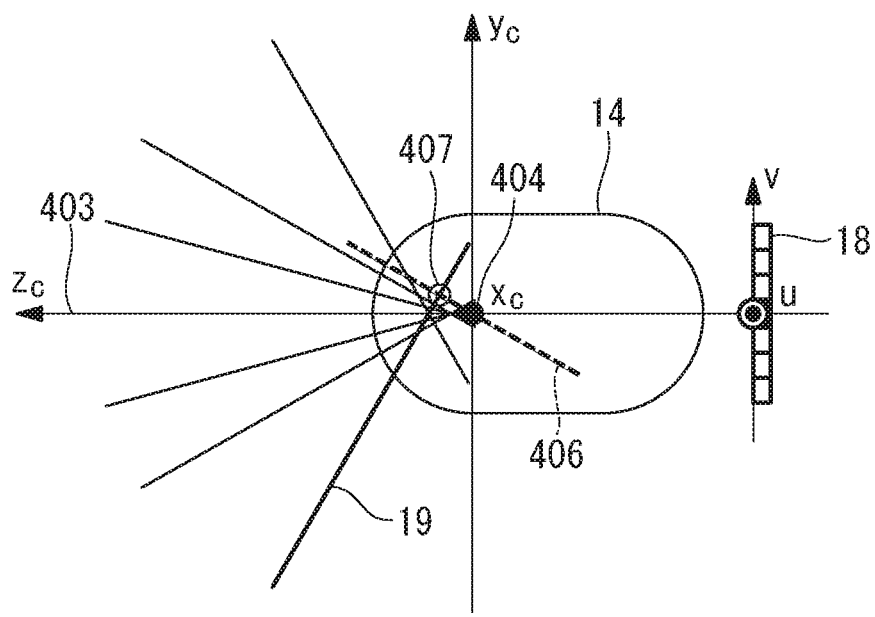
FIG. 4A is an illustration of a camera model used in the calibration device in FIG. 1, showing a cross section of the camera for explaining object-side principal rays corresponding to the pixel coordinates of the camera.
Figure 4B:
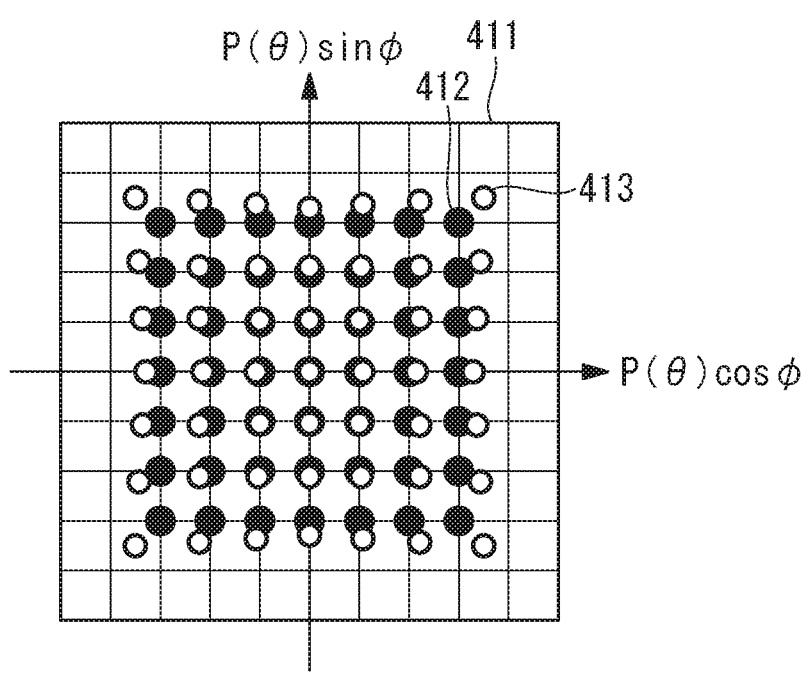
FIG. 4B is an illustration of the camera model used in the calibration device in FIG. 1, showing the directions of the principal rays corresponding to the individual pixels.
Figure 4C:
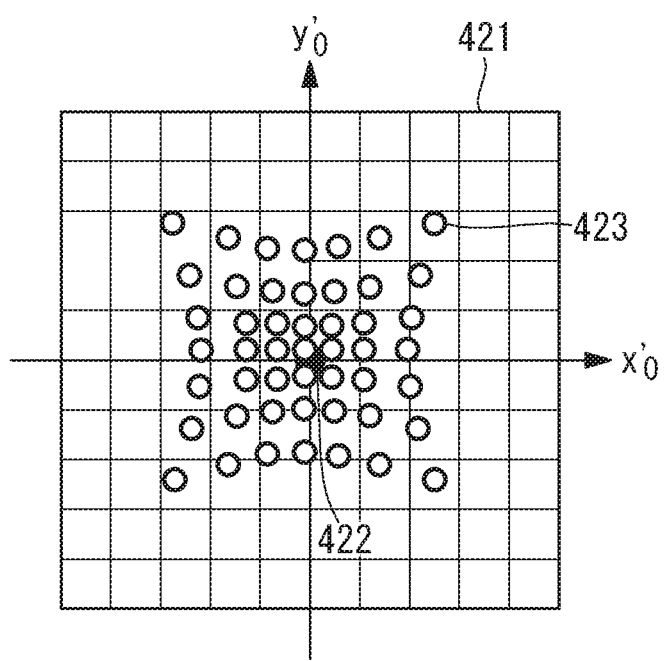
FIG. 4C is an illustration of the camera model used in the calibration device in FIG. 1, showing the intercepts of the principal rays corresponding to the individual pixels.

FIG. 4A is a sectional view of the camera 2, which serves to explain object-side principal rays associated with the pixel coordinates of the camera 2. The camera 2 includes an imaging optical system (optical system) 14 and an imaging element (image conversion element) 18.

Furthermore, the camera coordinates ($x_c$, $y_c$, zc) are defined as shown in FIG. 4A. The origin of the camera coordinates is the center 404 of the entrance pupil of the imaging optical system 14, and the $z_c$ axis coincides with the optical axis 403. Furthermore, a u axis and a v axis of pixel coordinates are defined for the imaging surface of the imaging element 18, parallel to the horizontal direction and the vertical direction of the imaging element 18, respectively. The u axis and the v axis are respectively parallel to the $x_c$ axis and the $y_c$ axis of the camera coordinates. In this embodiment, the world coordinates and the camera coordinates substantially coincide with each other. FIG. 4A depicts object-side principal rays 19 that are incident on the centers of the individual pixels of the imaging element 18 through the imaging optical system 14.

The principal rays 19 refer to rays that pass through the center of the aperture stop (not shown) of the imaging optical system 14. Thus, a blurred image on the imaging element 18, corresponding to an object point on a principal ray 19, spreads around the intersection between that principal ray 19 and the imaging element 18, so that the position of the image point is unchanged if the center of gravity of the light intensities at the blurred image points is considered as the image position. Therefore, all the object points on an object-side principal ray 19 form an image at a single image point. That is, the object-side principal ray 19 is a back-projected straight line of the image point.

The relationship between the direction of a principal ray 19 and the image point corresponding thereto is expressed by a projection formula. For example, when the imaging optical system 14 is designed for central projection, the angle of view θ of an object-side principal ray 19 and the height y of the imaging point corresponding thereto have the relationship y=f tan θ, where f denotes the focal length of projection. Other typical projection formulae include equidistant projection y=fθ, equisolid angle projection y=2 f sin(θ/2), stereographic projection y=2 f tan(θ/2), and orthographic projection y=f sin θ.

One of these projection formulae is selected according to the purpose of usage of the camera 2. For example, in equisolid angle projection, the solid angle on the object side, i.e., the apparent size, is saved as the area of an image. Therefore, equisolid angle projection is suitable for an application such as measuring the ratio of the amount of cloud to the whole sky. Other projection formulae also have their individual strengths. Meanwhile, the imaging optical system 14 for general photography does not necessarily depend on any specific one of the abovementioned projection formulae. Thus, an arbitrary projection formula, including any specific one of the abovementioned projection formulae, will be expressed as y=fP(θ). P(θ) is a function of the angle of view θ, and for example, P(θ)=θ for equidistant projection, and P(θ)=2 sin(θ/2) for equisolid angle projection. Furthermore, it is generally possible to designate an arbitrary projection formula with the coefficients in a power polynomial in Eq. 6.

$$P(\theta) = \theta + c_3 \theta^3 + c_5 \theta^5 + \quad \{\text{Eq. 6}\}$$

Next, the pupil aberration will be described. The entrance pupil is a virtual aperture generated by forming an image of the aperture stop by means of an optical system located on the object side thereof. As shown in FIG. 4A, the group of object-side principal rays passes through the vicinity of the center 404 of the entrance pupil, but does not intersect the entrance pupil at the single point located at the center 404.

This is because the aberration of the abovementioned optical system is involved in the image-forming relationship between the aperture stop and the entrance pupil. This is pupil aberration. Therefore, in order to dictate the object-side principal rays 19 corresponding to the pixels of the imaging element 18, it is necessary to create an accurate model of movement of the primary rays based on the directions and pupil aberrations of the primary rays.

A camera model according to the present invention, which is created so as to be suitable for such a situation, will be described. First, a model of the directions of the primary rays will be described with reference to FIG. 4B. Although this embodiment will be described in the context of, as an example, the imaging element 18 in which the pixels are arrayed to form a square lattice, this embodiment is not limited to this example.

Furthermore, camera coordinates $(r, \theta, \varphi)$ represented by spherical coordinates are newly introduced. The polar angle $\theta$ thereof is equal to the angle made by a principal ray 19 and the optical axis 403, i.e., is equal to the angle of view. Furthermore, the azimuth $\varphi$ is an angle representing the direction about the optical axis 403. The relationship between the orthogonal coordinates and camera coordinates $(x_c, y_c, z_c)$ is expressed by Eq. 7.

$$\begin{pmatrix} x_c \\ y_c \\ z_c \end{pmatrix} = \begin{pmatrix} r\sin\theta\cos\varphi \\ r\sin\theta\sin\varphi \\ r\cos\theta \end{pmatrix} \quad \{\text{Eq. 7}\}$$

When the imaging optical system 14 is designed with the projection formula $y=fP(\theta)$, if the directions of principal rays associated with the individual pixels on the imaging element 18 are plotted on a $P(\theta)\cos\varphi$–$P(\theta)\sin\varphi$ plane 411, the directions are arrayed to form a square lattice similar to the pixel array. However, since the actual imaging optical system 14 involves manufacturing errors, the directions of the principal rays are displaced to directions 413 different from the directions of the square lattice 412.

In the present invention, the displacement from the designed directions 412 to the actual directions 413 are considered as a phenomenon similar to distortion of the image position due to distortion aberration. That is, in this embodiment, on the basis of the Brown model in Eq. 5, a model of the direction $(\theta, \varphi)$ of a principal ray associated with a pixel coordinate $(u, v)$ on the imaging element 18 is created as in Eq. 8.

$$P(\theta)\begin{pmatrix} \cos\varphi \\ \sin\varphi \end{pmatrix} = \quad \{\text{Eq. 8}\}$$
$$k_0\begin{pmatrix} u \\ v \end{pmatrix} + k_1\rho^2\begin{pmatrix} u \\ v \end{pmatrix} + p_1\begin{pmatrix} \rho^2 + 2u^2 \\ 2uv \end{pmatrix} + p_2\begin{pmatrix} 2uv \\ \rho^2 + 2v^2 \end{pmatrix} + \begin{pmatrix} \Delta u \\ \Delta v \end{pmatrix}$$

where $\rho^2 = u^2 + v^2$

Here, the changes from the Brown model in Eq. 5 to the direction model in Eq. 8 are as follows:

(1) The term with coefficient $k_0$ corresponding to the lateral magnification is added.

(2) Only the third-order movement-radius distortion $k_1$ and the second-order tangential distortion $(p_1, p_2)$ are considered.

(3) The lateral movement $(\Delta u, \Delta v)$ of the direction distribution is added.

Next, a model of the intercept of a principal ray will be described with reference to FIGS. 4A and 4C. First, an $x_0'$-$y_0'$ plane 406 obtained by rotating the $x_c$-$y_c$ plane perpendicular to the $z_c$ axis and passing through the center 404 of the entrance pupil so as to be perpendicular to a principal ray 19 of interest will be considered. Furthermore, the intersection 407 between the principal ray 19 and the plane 406 is defined as "the intercept of the principal ray". When the operation described above is performed for all the principal rays, a single plane 421 in which the intercepts of the individual principal rays are plotted is obtained.

When the imaging optical system 14 involves no pupil aberration, the intercepts of all the principal rays are located at the origin 422. With the actual imaging optical system 14, however, in many cases, the pupil aberration increases as the angle of view becomes greater, and thus the intercept distribution 423 constitutes a distribution like pincushion distortion. In the present invention, the intercept distribution 423 is considered as a phenomenon similar to the distortion of an image position due to distortion aberration. That is, in this embodiment, a model of the coordinates $(x_0', y_0')$ of an intercept on the plane 421 is created as in Eq. 9, similarly to Eq. 8. The individual coefficients of the intercept are denoted with primes attached thereto.

$$\begin{pmatrix} x_0' \\ y_0' \end{pmatrix} = \quad \{\text{Eq. 9}\}$$
$$k_0'\begin{pmatrix} u \\ v \end{pmatrix} + k_1'\rho^2\begin{pmatrix} u \\ v \end{pmatrix} + p_1'\begin{pmatrix} \rho^2 + 2u^2 \\ 2uv \end{pmatrix} + p_2'\begin{pmatrix} 2uv \\ \rho^2 + 2v^2 \end{pmatrix} + \begin{pmatrix} \Delta u' \\ \Delta v' \end{pmatrix}$$

By using the model of the principal ray direction $(\theta, \varphi)$ in Eq. 8 and the model of the intercept $(x_0', y_0')$ in Eq. 9, corresponding to the pixel coordinates $(u, v)$ on the imaging element 18, the camera model according to the present invention, i.e., the linear equation of a principal ray is expressed as in Eq. 10.

$$\begin{pmatrix} x_c \\ y_c \\ z_c \end{pmatrix} = R_s \begin{pmatrix} x_0' \\ y_0' \\ 0 \end{pmatrix} + \mu \begin{pmatrix} \ell \\ m \\ n \end{pmatrix} \quad \{\text{Eq. 10}\}$$

where $(l, m, n)$ denotes a direction cosine representing the principal ray direction and has the relationship in Eq. 11 with $(\theta, \varphi)$ in Eq. 8.

$$\begin{pmatrix} \ell \\ m \\ n \end{pmatrix} = \begin{pmatrix} \sin\theta\cos\varphi \\ \sin\theta\sin\varphi \\ \cos\theta \end{pmatrix} \quad \{\text{Eq. 11}\}$$

Furthermore, Rs denotes a three-dimensional rotation matrix for rotating the $z_c$ axis in the direction of $(l, m, n)$, and μ denotes a parameter of a straight line. Since Rs also depends on the pixel coordinates (u, v), Eq. 11 represents a non-linear model. A method in which the non-linear model is transformed into a linear model for the purpose of computation will be described with reference to FIGS. 5A and 5B.

Figure 5A:
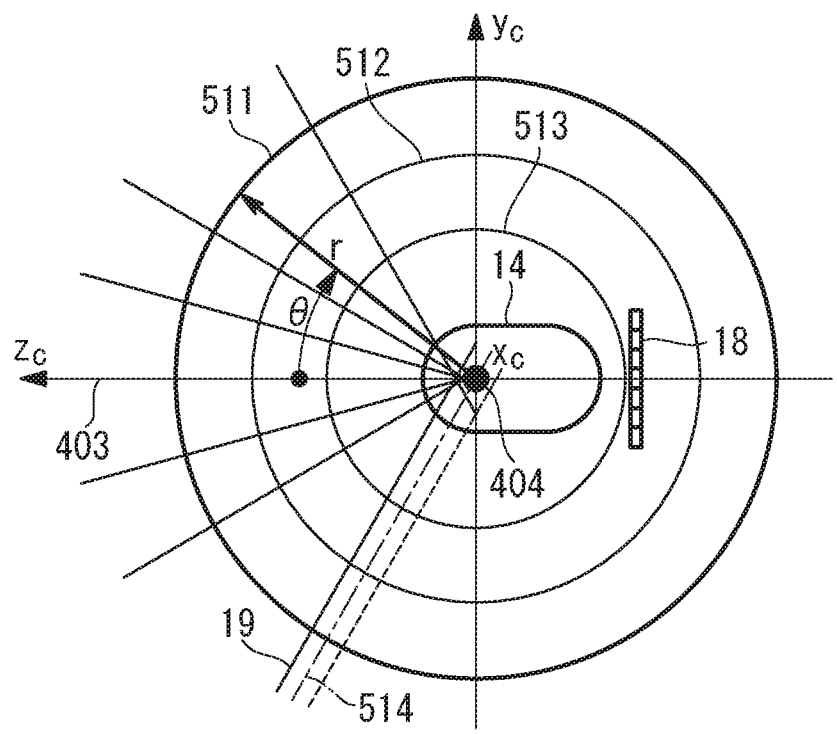
FIG. 5A is an illustration of a space in which the camera model in FIGS. 4A to 4C is projected, showing a cross section of an image-capturing optical system and an image-capturing element of the camera as well as the camera coordinates.

FIG. 5A is a sectional view of the imaging optical system 14 and the imaging element 18 of the camera 2 as well as the camera coordinates ($x_c$, $y_c$, $z_c$), similarly to FIG. 4A. In the present invention, the camera coordinate space in FIG. 5A is transformed into a projected coordinate space (ξ, η, r) in FIG. 5B. That is, an object point ($x_c$, $t_c$, $z_c$) on a spherical surface 511 of radius r in FIG. 5A is transformed via the spherical coordinates (r, θ, φ) in Eq. 7 onto a plane 521 in FIG. 5B by using Eq. 12.

$$\begin{pmatrix} \xi \\ \eta \end{pmatrix} = rP(\theta)\begin{pmatrix} \cos\varphi \\ \sin\varphi \end{pmatrix} \quad \{Eq.\ 12\}$$

Figure 5B:
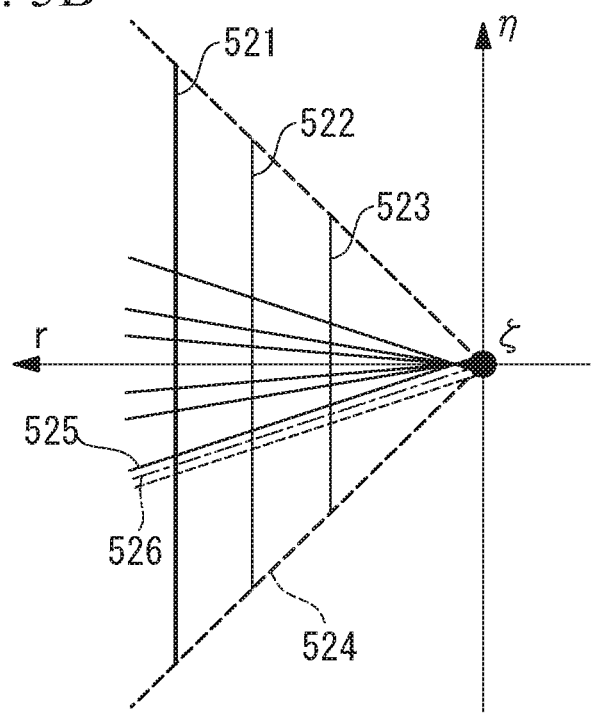
FIG. 5B is an illustration of the space in which the camera model in FIGS. 4A to 4C is projected, showing the projected coordinate space.

Similarly, spherical surfaces 512 and 513 in FIG. 5A are respectively transformed to planes 522 and 523 in FIG. 5B. In this way, the entire space centered around the center 404 of the entrance pupil in FIG. 5A is transformed into the interior of a cone surrounded by broken lines 524 in FIG. 5B.

A principal ray 19 in the camera coordinates corresponds to a straight line 535 in the projected coordinate space (ξ, η, r). The straight line 525 is expressed by Eq. 13 by using the slope (a, c) thereof relative to the r axis and the intersection thereof with the r=0 plane, i.e., the intercept (b, d).

$$\begin{pmatrix} \xi \\ \eta \end{pmatrix} = \begin{pmatrix} a \\ c \end{pmatrix} r + \begin{pmatrix} b \\ d \end{pmatrix} \quad \{Eq.\ 13\}$$

However, the straight line 525 in Eq. 13 becomes a curved line instead of a straight line when inversely transformed into the original camera coordinates in FIG. 5A. Meanwhile, when the distance r from the center 404 of the entrance pupil is sufficiently large, on the basis of Eqs. 12 and 13, the slope (a, c) coincides with the model of the principal ray direction in Eq. 8. Therefore, the principal ray 19 in FIG. 5A constitutes an asymptote to the curved line obtained by inverse transformation into the camera coordinates, and it is possible to obtain the direction thereof from the slope (a, c) in Eq. 13.

Meanwhile, the intercept (b, d) in Eq. 13 has a relationship in Eq. 14 with the intercept ($x_0'$, $y_0'$) in Eq. 9.

$$\begin{pmatrix} b \\ d \end{pmatrix} = R_z M R_z^{-1} \begin{pmatrix} x_0' \\ y_0' \end{pmatrix} \quad \{Eq.\ 14\}$$

Here, Rz denotes Eq. 15, which represents a rotation matrix about the origin of the $x_0$-$y_0'$ plane.

$$R_z = \begin{pmatrix} \cos\varphi & -\sin\varphi \\ \sin\varphi & \cos\varphi \end{pmatrix} \quad \{Eq.\ 15\}$$

M denotes Eq. 16, which is a matrix representing magnification by projection.

$$M = \begin{pmatrix} m_\theta & 0 \\ 0 & m_\varphi \end{pmatrix} \text{ where } m_\theta = \frac{dP(\theta)}{d\theta},\ m_\varphi = \frac{P(\theta)}{\sin\theta} \quad \{Eq.\ 16\}$$

The relationship in Eq. 14 will be described referring back to FIGS. 5A and 5B. First, a cylindrical surface having a center axis at the straight line 514 parallel to the principal ray 19 in FIG. 5A and passing through the center 404 of the entrance pupil, including the principal ray 19, will be considered. The lines of intersection between the cylindrical surface and the spherical surfaces 511, 512, and 513 individually constitute circles having the same radius.

Similarly to the above, in FIG. 5, a straight line 526 parallel to the straight line 525 and passing through the coordinate origin will be considered. Note that transforming the straight line 514 according to Eq. 12 yields a straight line that coincides with the straight line 526. At this time, the surface corresponding to the cylindrical surface in FIG. 5A and including the straight line 525 in FIG. 5B constitutes an elliptic cylinder centered about the straight line 526. This is because when the abovementioned circles on the spherical surfaces 511, 512, and 513 are projected onto the ξ-η plane, the circles are magnified by a factor of mθ in the θ direction of spherical coordinates and a factor of mφ in the φ direction orthogonal thereto to become ellipses.

Therefore, the relationship in Eq. 14 holds.

As described above, by transforming an object point ($x_c$, $y_c$, $z_c$) in the camera coordinates into the (ξ, η, r) coordinates according to Eq. 12 and then fitting the straight-line group model in Eq. 13, it is possible to obtain the model of the direction of a principal ray 19 in Eq. 8 and the intercept model in Eq. 9.

Note that, in this embodiment, a model having the same form as Eq. 9 is adopted as a model of the intercept (b, d) in Eq. 13. That is, on the basis of Eqs. 8, 9, and 13, Eq. 17 is used as a model of the straight line 525 in the (ξ, η, r) coordinate space.

$$\begin{pmatrix} \xi \\ \eta \end{pmatrix} = (k_0 r + k_0'')\begin{pmatrix} u \\ v \end{pmatrix} + (k_1 r + k_1'')\rho^2 \begin{pmatrix} u \\ v \end{pmatrix} + (p_1 r + p_1'')\begin{pmatrix} \rho^2 + 2u^2 \\ 2uv \end{pmatrix} + (p_2 r + p_2'')\begin{pmatrix} 2uv \\ \rho^2 + 2v^2 \end{pmatrix} + \begin{pmatrix} \Delta u r + \Delta u'' \\ \Delta v r + \Delta v'' \end{pmatrix} \quad \{Eq.\ 17\}$$

When the distance r of the region to be subjected to camera calibration is sufficiently large, it is possible to obtain the direction and intercept of a principal ray 19 with high accuracy from the model in Eq. 17. Meanwhile, when the distance r is not sufficiently large, the direction and intercept of a principal ray 19 as obtained from Eq. 17 deviate from those of an actual principal ray, as described earlier.

In that case, the parameters in Eq. 10 representing a linear equation of a principal ray, i.e., the coefficients in Eqs. 8 and 9, should be subjected to iterative optimization in the original camera coordinates in FIG. 5A.

It is possible to implement the iterative optimization by using an ordinary optimization algorithm. However, it may take time for convergence when the number of parameters is large. In that case, it is effective to adopt a method of alternately optimizing the principal-ray direction model in Eq. 8 and the intercept model in Eq. 9. This method will be described below.

The state in which the principal-ray model in Eq. 10 given earlier is deviated from an actual principal ray is expressed by Eq. 18.

$$\begin{pmatrix} x_c \\ y_c \\ z_c \end{pmatrix} = \tilde{R}_s \begin{pmatrix} \tilde{x}_0' \\ \tilde{y}_0' \\ 0 \end{pmatrix} + \mu \begin{pmatrix} \tilde{l} \\ \tilde{m} \\ \tilde{n} \end{pmatrix} + \begin{pmatrix} \varepsilon_x \\ \varepsilon_y \\ \varepsilon_z \end{pmatrix} \quad \{Eq.\ 18\}$$

Here, tildes are attached to parameters that are not sufficiently optimized. At this time, the components of a perpendicular line drawn from camera coordinates $(x_c, y_c, z_c)$ of measurement data to the straight-line model of a principal ray constitute residuals $(\varepsilon_x, \varepsilon_y, \varepsilon_z)$. Furthermore, both sides of Eq. 18 are inversely rotated by using the rotation matrix Rs to obtain Eq. 19 (primes are added to the camera coordinates and residuals after the inverse rotation).

$$\begin{pmatrix} x_c' \\ y_c' \\ z_c' \end{pmatrix} = \begin{pmatrix} \tilde{x}_0' \\ \tilde{y}_0' \\ 0 \end{pmatrix} + \mu \begin{pmatrix} 0 \\ 0 \\ 1 \end{pmatrix} + \begin{pmatrix} \varepsilon_x' \\ \varepsilon_y' \\ 0 \end{pmatrix} \quad \{Eq.\ 19\}$$

$$\begin{pmatrix} x_c' \\ y_c' \\ z_c' \end{pmatrix} = \tilde{R}_s^{-1} \begin{pmatrix} x_c \\ y_c \\ z_c \end{pmatrix}, \begin{pmatrix} \varepsilon_x' \\ \varepsilon_y' \\ 0 \end{pmatrix} = \tilde{R}_s^{-1} \begin{pmatrix} \varepsilon_x \\ \varepsilon_y \\ \varepsilon_z \end{pmatrix}$$

By using Eq. 19, it is possible to obtain a residual distribution $(\varepsilon_x', \varepsilon_y', \mu)$ from the camera coordinates (xc, yc, zc) of measurement data.

Then, an update formula for updating the unsuitable parameter in Eq. 18 to the suitable parameter in Eq. 10 is prepared. For this purpose, both sides of Eq. 10 are also inversely rotated by using the rotation matrix Rs, and the differences between the results and both sides of Eq. 19 are calculated to obtain Eq. 20.

$$\begin{pmatrix} \varepsilon_x' \\ \varepsilon_y' \end{pmatrix} \approx \begin{pmatrix} \Delta l' \\ \Delta m' \end{pmatrix} \mu + \begin{pmatrix} \Delta x_0' \\ \Delta y_0' \end{pmatrix} \quad \{Eq.\ 20\}$$

$$\begin{pmatrix} \Delta l' \\ \Delta m' \\ 0 \end{pmatrix} \approx \tilde{R}_s^{-1} \begin{pmatrix} l - \tilde{l} \\ m - \tilde{m} \\ n - \tilde{n} \end{pmatrix}, \begin{pmatrix} \Delta x_0' \\ \Delta y_0' \end{pmatrix} = \begin{pmatrix} x_0' - \tilde{x}_0' \\ y_0' - \tilde{y}_0' \end{pmatrix}$$

As described above, the residuals attributable to the unsuitable parameter constitute a straight line group having slopes $(\Delta 1', \Delta m')$ and intercepts $(\Delta x_0', \Delta y_0')$ in the $(\varepsilon_x', \varepsilon_y', \mu)$ space. Therefore, it is possible to update the individual coefficients in the intercept model in Eq. 9 by adding the individual coefficients (k0", k1", p1", p2", $\Delta$u", $\Delta$v") of the intercepts obtained by fitting the straight-line group model in Eq. 21 to these residuals, Eq. 21 being generated by substituting $(\varepsilon_x', \varepsilon_y', \mu)$ for $(\xi, \eta, r)$ in Eq. 17, to the individual corresponding coefficients in the intercept model in Eq. 9.

$$\begin{pmatrix} \varepsilon_x' \\ \varepsilon_y' \end{pmatrix} = \quad \{Eq.\ 21\}$$

$$(k_0\mu + k_0'')\begin{pmatrix} u \\ v \end{pmatrix} + (k_1\mu + k_1'')\rho^2\begin{pmatrix} u \\ v \end{pmatrix} + (p_1\mu + p_1'')\begin{pmatrix} \rho^2 + 2u^2 \\ 2uv \end{pmatrix} +$$

$$(p_2\mu + p_2'')\begin{pmatrix} 2uv \\ \rho^2 + 2v^2 \end{pmatrix} + \begin{pmatrix} \Delta u\mu + \Delta u'' \\ \Delta v\mu + \Delta v'' \end{pmatrix}$$

Then, the direction model in Eq. 8 is updated on the basis of the intercept model in the updated Eq. 9. That is, the direction cosine (1, m, n) in Eq. 10 is obtained from the camera coordinates $(x_c, y_c, z_c)$ of measurement data and the updated intercept. The direction cosine (1, m, n) is transformed into the form on the left-hand side of Eq. 8 by using Eqs. 11 and 6, and the direction model in Eq. 8 is fitted to the result to update the individual coefficients therein.

The principal-ray direction model in Eq. 8 and the intercept model in Eq. 9 are optimized alternately by repeating the procedure described above. This makes it possible to obtain the suitable principal-ray model in Eq. 10.

As described above, the camera models used in the camera calibration device 1 according to this embodiment, expressed in Eqs. 8, 9, and 17, are models of an object-side principal ray corresponding to pixel coordinates. These models are constructed on the basis of the linear model in Eq. 5 representing the image-forming relationship, involving distortion aberration, between object coordinates and pixel coordinates. In particular, the model of the coordinate system obtained by transformation using the projection formula in Eq. 17 has a feature that it has a form wherein, on the basis of the linear model in Eq. 5 representing the image-forming relationship involving distortion, the individual coefficients therein are replaced with first-order equations of the distance r.

Furthermore, another feature of the camera model in Eq. 17 used in the camera calibration device 1 according to this embodiment is that it represents a projected object coordinate vector $(\xi, \eta)$ by using the linear sum of linearly independent two-dimensional basis function vectors constituted of variables (u, v, r). Since the linear sum of basis function vectors is used, the coefficients of the models representing $\xi$ and $\eta$ coordinates are in common. Thus, it is possible to obtain the coefficients of the individual basis function vectors from all the measurement data by using the linear least squares method.

Figure 6:
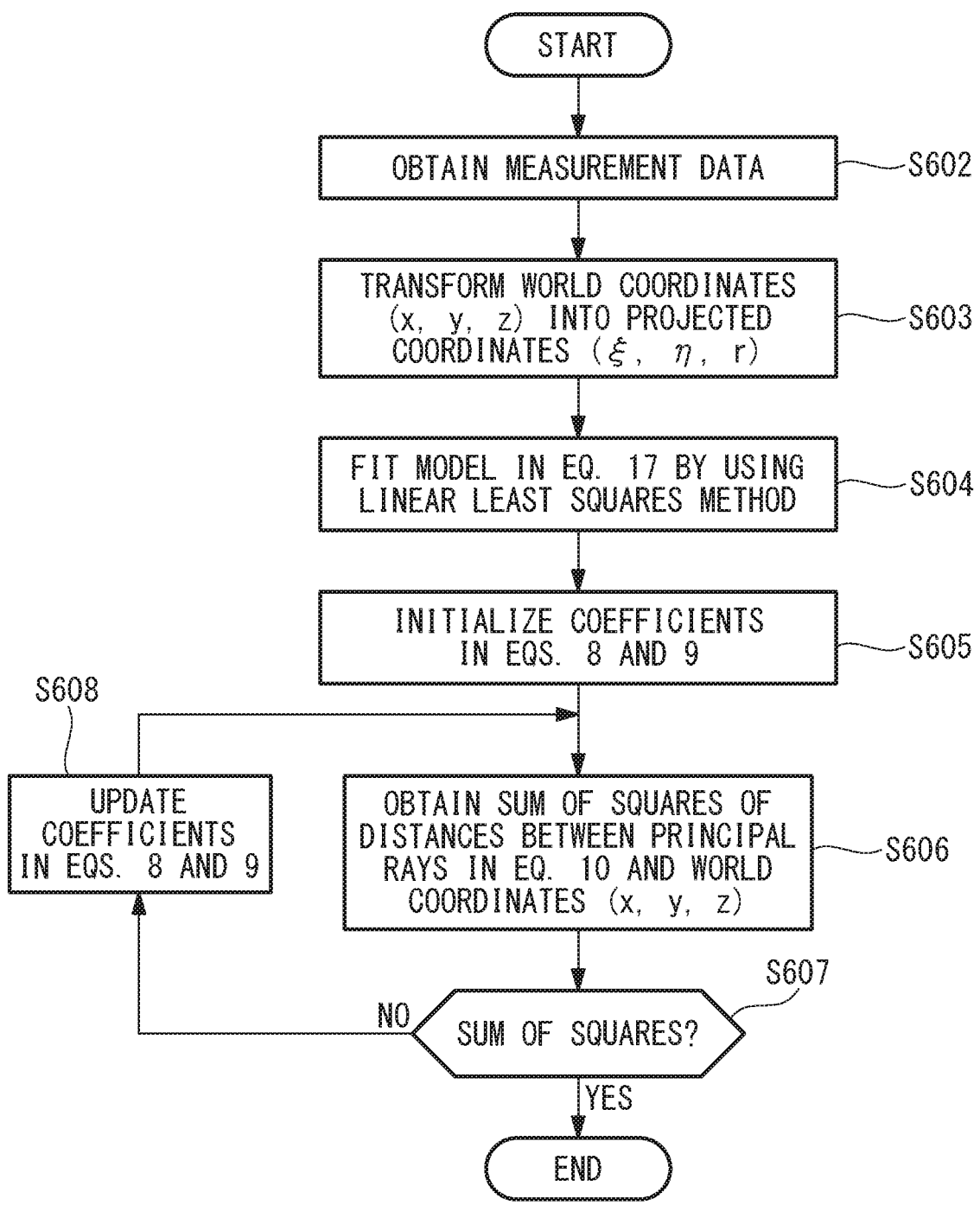
FIG. 6 shows a flowchart of a procedure for calibrating a camera by using the calibration device in FIG. 1.

Next, a procedure for calibrating a camera by using the camera calibration device 1 according to this embodiment will be described with reference to FIG. 6. First, in the measurement program described earlier and shown in FIG. 3, measurement data representing correspondence between world coordinates (x, y, z) and pixel coordinates (u, v) is obtained (step S602). Then, by using Eqs. 7 and 12, the world coordinates (x, y, z) are transformed into projected coordinates $(\xi, \eta, r)$ (step S603). Then, the camera model expressed in Eq. 17 is fitted to all the pixel coordinates (u, v) of measurement data and the projected coordinates $(\xi, \eta, r)$ by using the linear least squares method to obtain the individual coefficients (camera parameters) of the camera model in Eq. 17 (step S604).

Furthermore, the coefficients $(k_0, k_1, p_1, p_2, \Delta u, \Delta v)$ in Eq. 8 and the coefficients $(k_0', k_1', p_1', p_2', \Delta u', \Delta v')$ in Eq. 9 are initialized respectively with the obtained coefficients $(k_0, k_1, p_1, p_2, \Delta u, \Delta v)$ and $(k_0'', k_1'', p_1'', p_2'', \Delta u'', \Delta v'')$ in Eq. 17 (step S605). Note that the effect M of magnification by the projection in Eq. 14 is disregarded when the coefficients ($k_0"$, $k_1"$, $p_1"$, $p_2"$, $\Delta u"$, $\Delta v"$) in Eq. 17 are used as the initial values of the coefficients ($k_0'$, $k_1'$, $p_1'$, $p_2'$, $\Delta u'$, $\Delta v'$) in Eq. 9. However, since the matrix M becomes approximate to the unit matrix when the angle of view is not large, this setting of initial values works effectively.

Then, the distance between the principal ray in Eq. 10 and the world coordinates (x, y, z) corresponding to pixel coordinates (u, v) is calculated for all the measurement data, and the sum of squares of the calculated distances is obtained (step S606). When the sum of squares is less than a predetermined value, the camera calibration is finished. Otherwise, through step S608 of updating the coefficients ($k_0$, $k_1$, $p_1$, $p_2$, $\Delta u$, $\Delta v$) in Eq. 8 and the coefficients ($k_0'$, $k_1'$, $p_1'$, $p_2'$, $\Delta u'$, $\Delta v'$) in Eq. 9, the procedure returns to step S606 (step S607).

This iterative optimization is executed by using an ordinary optimization algorithm, such as the downhill simplex method, or the alternate optimization algorithm described earlier. In the case of alternate optimization, step S608 is the following procedure.

(1) By using Eq. 19, a residual distribution ($\varepsilon_x'$, $\varepsilon_y'$, $\mu$) is obtained from the camera coordinates ($x_c$, $y_c$, $z_c$) of the measurement data and the current parameters of the principal ray model.

(2) The straight-line-group model in Eq. 21 is fitted to the residual distribution.

(3) The individual coefficients ($k_0"$, $k_1"$, $p_1"$, $p_2"$, $\Delta u"$, $\Delta v"$) of the intercepts in the fitted model in Eq. 21 are respectively added to the corresponding coefficients in the intercept model in Eq. 9.

(4) The direction cosine (l, m, n) in Eq. 10 is obtained from the camera coordinates ($x_c$, $y_c$, $z_c$) of the measurement data and the intercept updated in (3).

(5) These direction cosines are transformed into the form on the left-hand side of Eq. 8 by using Eqs. 11 and 6.

(6) The direction model in Eq. 8 is fitted to the resulting data to update the individual coefficients therein.

The individual coefficients of the camera model are obtained as described above, and then the camera calibration in this embodiment is finished.

The camera model in which the camera parameters obtained in this embodiment are set can be used as follows in a photographing device including the camera 2 having the camera model installed therein. The photographing device further includes a straight-line calculating unit (principal-ray calculating unit: not shown) that calculates a straight line corresponding to pixel coordinates in the world coordinate space; a world-coordinate calculating unit (not shown) that calculates three-dimensional world coordinates; and a distortion-corrected-image generating unit (not shown) that generates an image in which distortion is corrected.

First, when a principal ray in the world coordinates is to be obtained, the straight-line calculating unit assigns pixel coordinates (u, v) of interest in Eqs. 8 and 9, thereby obtaining the direction ($\theta$, $\varphi$) and intercept ($x_0'$, $y_0'$) of the principal ray. Furthermore, an equation of the principal ray is obtained as in Eq. 10.

Second, when world coordinates corresponding to the pixel coordinates (u, v) on a predetermined plane or curved surface are to be obtained, the world-coordinate calculating unit calculates the intersection between the principal ray expressed by the abovementioned equation and the predetermined plane or curved surface, thereby obtaining the target world coordinates (x, y, z).

Third, with the distortion-corrected-image generating unit, it is possible to correct distortion in an image captured by the calibrated camera 2. A method for this purpose will be described. When an image of an object represented in world coordinates is captured by the camera 2, the image becomes distorted. Thus, it is possible to correct the distortion by projecting the acquired image onto the world coordinates by using the camera model described above. When an image of an object located in a plane with a known object distance z is captured, the world-coordinate calculating unit calculates the intersection between the principal ray for pixel coordinates (u, v) and the plane with the object distance z, thereby projecting the pixel coordinates (u, v) to world coordinates (x, y).

Meanwhile, when an image of an object not located in such a plane is captured, a reference object distance for distortion correction is defined, and the image is projected onto world coordinates (x, y) with that object distance z. This distortion correction suffices if variations in distortion aberration depending on the object distance are small. However, an image becomes magnified or reduced when projected onto world coordinates. Thus, projected world coordinates are normalized by the lateral magnification $k_0 z$ in Eq. 8. This makes it possible to obtain a distortion-corrected image having substantially the same size as the original image.

Figure 7:
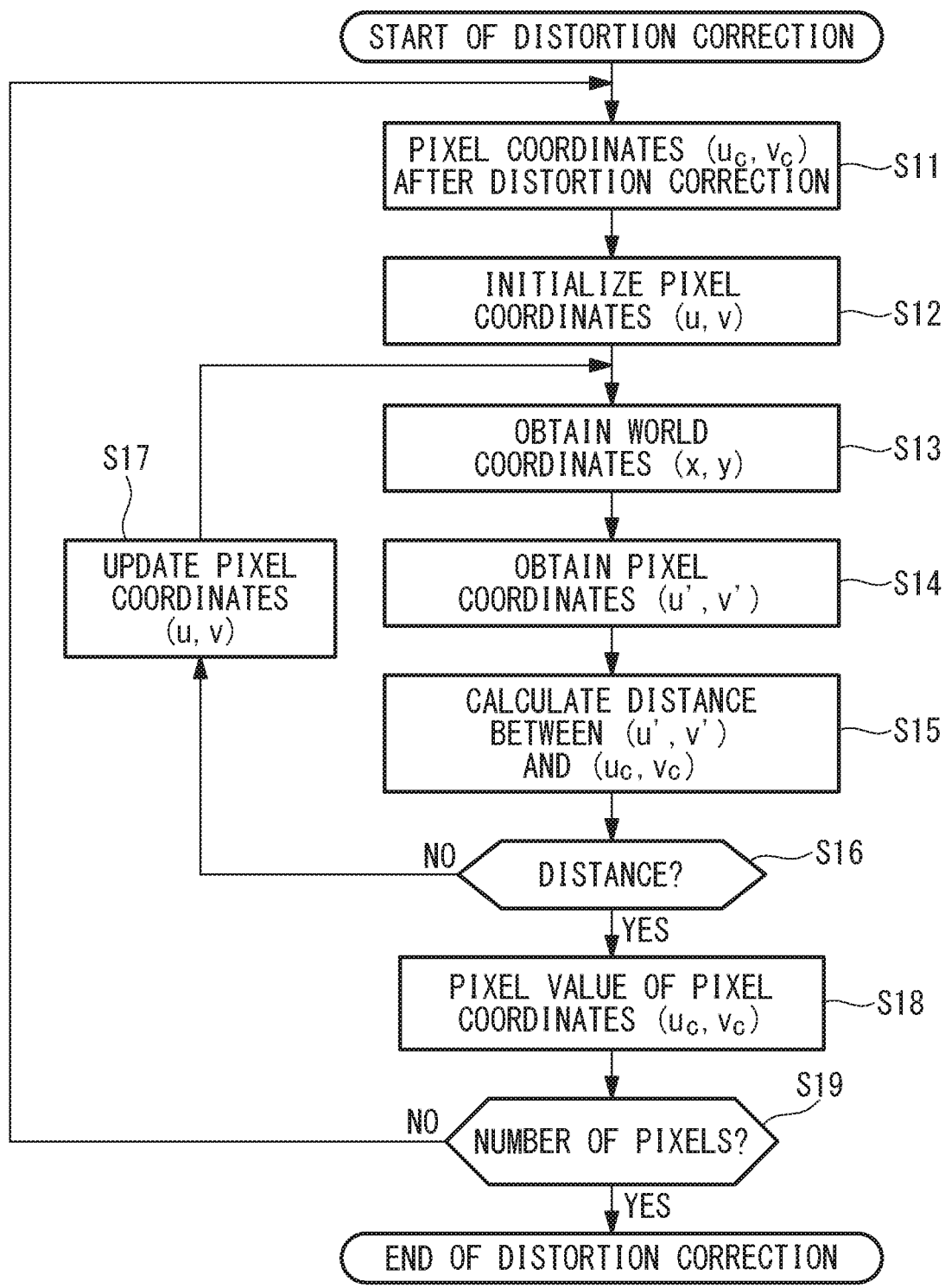
FIG. 7 shows a flowchart of distortion correction.

Creation of a distortion-corrected image is a procedure involving assigning the pixel values of the original image corresponding to the pixel coordinates (integers) of the distortion-corrected image to the pixel coordinates after distortion correction. This procedure will be described with reference to a flowchart in FIG. 7. Upon starting distortion correction, first pixel coordinates ($u_c$, $v_c$) after distortion correction are determined (step S11).

Then, initial values (0, 0) are assigned to pixel coordinates (u, v) before distortion correction (step S12). If it is possible in some way to estimate the pixel coordinates (u, v) before distortion correction, corresponding to the pixel coordinates ($u_c$, $v_c$) after distortion correction, the pixel coordinates (u, v) before distortion correction may be used as initial values.

The intersection between the principal ray for the pixel coordinates (u, v) before distortion correction and the plane with the reference object distance z is calculated to obtain world coordinates (x, y) (step S13). Then, the obtained world coordinates (x, y) are normalized by the lateral magnification $k_0 z$ to obtain pixel coordinates (u', v') (step S14).

The distance between the obtained pixel coordinates (u', v') and the pixel coordinates ($u_c$, $v_c$) after distortion correction is obtained (step S15). When the obtained distance is less than a predetermined value, the procedure proceeds to step S18. Otherwise, through the updating of the pixel coordinates (u, v) before distortion correction (step S17), the procedure returns to step S13 (step S16).

It is possible to execute the iterative optimization steps S13 to S17 by using an ordinary algorithm, such as the downhill simplex method. The method of updating the pixel coordinates (u, v) is chosen in accordance with the algorithm used.

The pixel coordinates (u, v) before distortion correction when the iterative optimization has converged corresponds to the pixel coordinates ($u_c$, $v_c$) after distortion correction via the camera model in Eq. 10. The pixel coordinates (u, v) are generally non-integers. Thus, the pixel values of the pixel coordinates (u, v) are obtained by bilinear interpolation from the pixel values of four pixels neighboring the pixel coordinates. Then, the obtained pixel values are used as the pixel values of the pixel coordinates ($u_c$, $v_c$) after distortion correction (step S18). Alternatively, other methods, such as bicubic interpolation, may be adopted for the interpolation of pixel values. The above steps S11 to S18 are repeated for all the pixel coordinates ($u_c$, $v_c$) after distortion correction (step S19), and then the distortion correction is finished.

In the above-described example of distortion correction, a plane with the object distance z is used as a reference. However, it is possible to modify the example so as to perform distortion correction with reference to other planes or curved surfaces in the world coordinate space. For example, there are cases where an image captured with the camera 2 designed with the intent of equidistant projection does not necessarily become an accurate equidistant projection image due to manufacturing errors, etc. of the camera 2. In such cases, it is possible to perform distortion correction so as to obtain an equidistant projection image as intended by dictating correspondence between pixel coordinates and world coordinates on a spherical surface having a reference radius on the basis of the projection formula $y=f\theta$ for equidistant projection and performing distortion correction on the basis of the correspondence by a procedure similar to the above-described procedure. The same applies to other projection methods.

In the above-described example of usage of the first to third camera models, world coordinates corresponding to pixel coordinates are calculated each time by using the camera model in Eq. 10. Alternatively, by calculating those world coordinates in advance and saving the world coordinates in the form of a data array, it is possible to increase the computation speed.

For example, in the first usage example, the directions and intercepts of principal rays corresponding to the individual pixel coordinates are calculated in advance individually in the form of data arrays. Alternatively, the intersections between two planes or curved surfaces such as spherical surfaces of the world coordinates and principal rays corresponding to the individual pixel coordinates may be calculated in advance in the form of data arrays, and the principal ray for the pixel of interest may be obtained by interpolating these data arrays. The same applies to other usage examples.

In this embodiment, camera calibration is performed on the basis of measurement data of lattice points 11 and 13 arrayed to form a square lattice on the planar chessboard 10. However, the feature points on the calibration chart 6 may be patterns other than the lattice points 11 and 13.

For example, measurement data may be created by capturing an image of dot marks distributed in a plane and using the position of the center of gravity thereof as pixel coordinates. Furthermore, the feature points used for camera calibration in the present invention need not be arrayed regularly in the world coordinate space. Even if the layout of the feature points is random, as long as it is possible to know the correspondence between the world coordinates and the pixel coordinates by way of measurement, simulation, or the like, it is possible to fit the camera model according to the present invention to the feature points.

As described above, the only condition required for measurement data for the camera calibration in this embodiment is that the correspondence between the world coordinates and the pixel coordinates is known. For example, it is also possible to obtain such measurement data by the following method. First, a point light source that is movable in the directions of the x, y, and z axes is prepared on the world coordinate side. Then, the point light source is moved in the directions of the x, y, and z axes such that the image of the point light source is located at the pixel coordinates of interest of the image of the point light source captured by the camera 2. It is also possible to obtain the correspondence between the world coordinates and the pixel coordinates by repeating this measurement.

Alternatively, in the case where it is not possible to encompass all the angles of view with a single calibration chart 6 because the angles of view of the camera are wide, calibration charts 6 may be installed at a plurality of angles of view so as to encompass all the angles of view of the camera. Also in this case, it is possible to fit the camera calibration method of this embodiment if the correspondence between the world coordinates of the feature points on the calibration charts 6 and the pixel coordinates is known.

In the camera model adopted in this embodiment, only the third-order movement-radius distortion and the second-order tangential distortion are taken into consideration. However, in the case where the camera 2 to be calibrated involves greater distortion aberration, it is possible to adopt a camera model in which terms of higher-order aberrations and terms of rotationally asymmetric distortion are added. In this case, a linear model like the image-forming formula in Eq. 5 representing the image-forming relationship between the imaging surface of the imaging element 18 and the plane conjugate therewith is prepared.

Then, it is possible to construct a new model of the direction and intercept of a principal ray by fitting the linear model to Eqs. 8 and 9. Alternatively, it is possible to construct a new camera model of the projected coordinate space by substituting linear equations of the distance r for the individual coefficients of the linear model, as in the camera model in Eq. 17. The optimization method for obtaining the individual coefficients is the same as that in this embodiment.

Conversely, it is also possible to omit unnecessary terms from the camera model. For example, in the case where the camera 2 to be calibrated involves rotationally asymmetric distortion components constantly at negligibly small levels, the term of tangential distortion of the camera model should be omitted. This serves to prevent the camera model from being meaninglessly modified to be inaccurate due to measurement errors of the lattice points 11. The same applies to the other terms.

In the procedure adopted in this embodiment, the camera parameters of the camera model of the camera coordinates in Eq. 10 are subjected to iterative optimization, while using, as initial values, camera parameters obtained by fitting the camera model of the projected coordinate space in Eq. 17. However, either one of these in the procedure may be omitted.

As described earlier, when the distance r of the range involved in camera calibration is sufficiently large, even if the iterative optimization of the model in Eq. 10 is omitted, it is possible to obtain the direction and intercept of a principal ray 19 with high accuracy from the model in Eq. 17. When the camera model 17 is used for a photographing device including the camera 2, the slope (a, c) and the intercept (b, d) in Eq. 13 are obtained from the relationship between Eq. 13 and Eq. 17. As described earlier, the slope (a, c) coincides with the principal-ray direction model in Eq. 8. Meanwhile, it is possible to transform the intercept (b, d) into the intercept ($x_0'$, $y_0'$) by using Eq. 14. In this way, it is possible to obtain the linear equation for a principal ray in Eq. 10.

Meanwhile, if the initialization of camera parameters by using the camera model of the projected coordinate space in Eq. 17 is omitted, there is high possibility of the occurrence of the problem of incorrect converged values or a huge computation time. However, it is possible to avoid the occurrence of such problems when the distortion aberration and pupil aberration of the camera 2 to be calibrated are small or when it is possible to estimate the initial values of the camera parameters from the design data or the like of the camera 2.

As described above, with the camera calibration device 1 and the camera calibration method according to this embodiment, it is possible to create an accurate model of the pupil aberration of the imaging optical system 14 by using the camera model according to this embodiment. Furthermore, it is also possible to create models of rotationally asymmetric distortion aberration and pupil aberration. This makes it possible to accurately represent the group of principle rays, which serves to improve the accuracy of the camera model.

Furthermore, since the camera model based on the projection formula of the camera 2 to be calibrated is used in the camera calibration device 1 and the camera calibration method according to this embodiment, it is possible to moderate the highest order required in the model. At the same time, as opposed to the existing art, it is also possible to calibrate cameras with half angles of view not less than 90°.

Furthermore, since a linear camera model is used in the camera calibration device 1 and the camera calibration method according to this embodiment, it is possible to fit the camera model to measurement data by using the linear least squares method. Therefore, as opposed to the existing art, optimization does not fail, and it is possible to considerably reduce the computation time.

Furthermore, the feature points used in the camera calibration device 1 and the camera calibration method according to this embodiment need not be arrayed regularly. Therefore, as long as it is possible to clarify the correspondence between the world coordinates and the pixel coordinates, it becomes possible to choose an arbitrary acquisition method based on measurement or calculation suitable for the camera 2 to be calibrated.

Next, a camera calibration method according to a second embodiment of the present invention will be described below with reference to the drawings. The camera calibration method described as the first embodiment is directed to the case where the entrance pupil of the camera 2 to be calibrated substantially coincides with the origin of the world coordinates, the optical axis is parallel to the z axis of the camera calibration device 1, and the horizontal direction and the vertical direction of the image-capturing surface are parallel to the x axis and the y axe, respectively, as shown in FIG. 1. The camera calibration method described as this embodiment is directed to the case where this condition is not satisfied, i.e., the world coordinates do not coincide with the camera coordinates.

The camera model used in the first embodiment is based on camera coordinates having the origin at the center 404 of the entrance pupil of the image-capturing optical system 14 of the camera 2 to be calibrated. Therefore, the abovementioned camera model is fittable when the world coordinates of the lattice points 11 on the calibration chart 6 in the camera calibration device 1 in FIG. 1 are transformed into camera coordinates. The transformation from the world coordinates $(x, y, z)$ to the camera coordinates $(x_c, y_c, z_c)$ is expressed in Eq. 22 by using the three-axis rotation matrix R and the translation vector T in Eq. 2.

$$\begin{pmatrix} x_c \\ y_c \\ z_c \end{pmatrix} = \begin{pmatrix} r_{11} & r_{12} & r_{13} \\ r_{21} & r_{22} & r_{23} \\ r_{31} & r_{32} & r_{33} \end{pmatrix} \begin{pmatrix} x \\ y \\ z \end{pmatrix} + \begin{pmatrix} t_x \\ t_y \\ t_z \end{pmatrix} \quad \{\text{Eq. 22}\}$$

Thus, in the second embodiment, of measurement data representing the correspondence between the world coordinates $(x, y, z)$ of a plurality of measured lattice points 11 and the pixel coordinates $(u, v)$, only the world coordinates are transformed into the camera coordinates $(x_c, y_c, z_c)$ by using Eq. 22, and then the camera model according to the first embodiment is fitted.

Then, the three-axis rotation angles $\theta_x$, $\theta_y$, and $\theta_z$ of the rotation matrix R and the three components $(t_x, t_y, t_z)$ of the translation vector T are optimized so as to minimize the residual thereof. Generally, the residual of the camera model is minimized when the world coordinates transformed by using Eq. 22 coincide with the camera coordinates.

Figure 8:
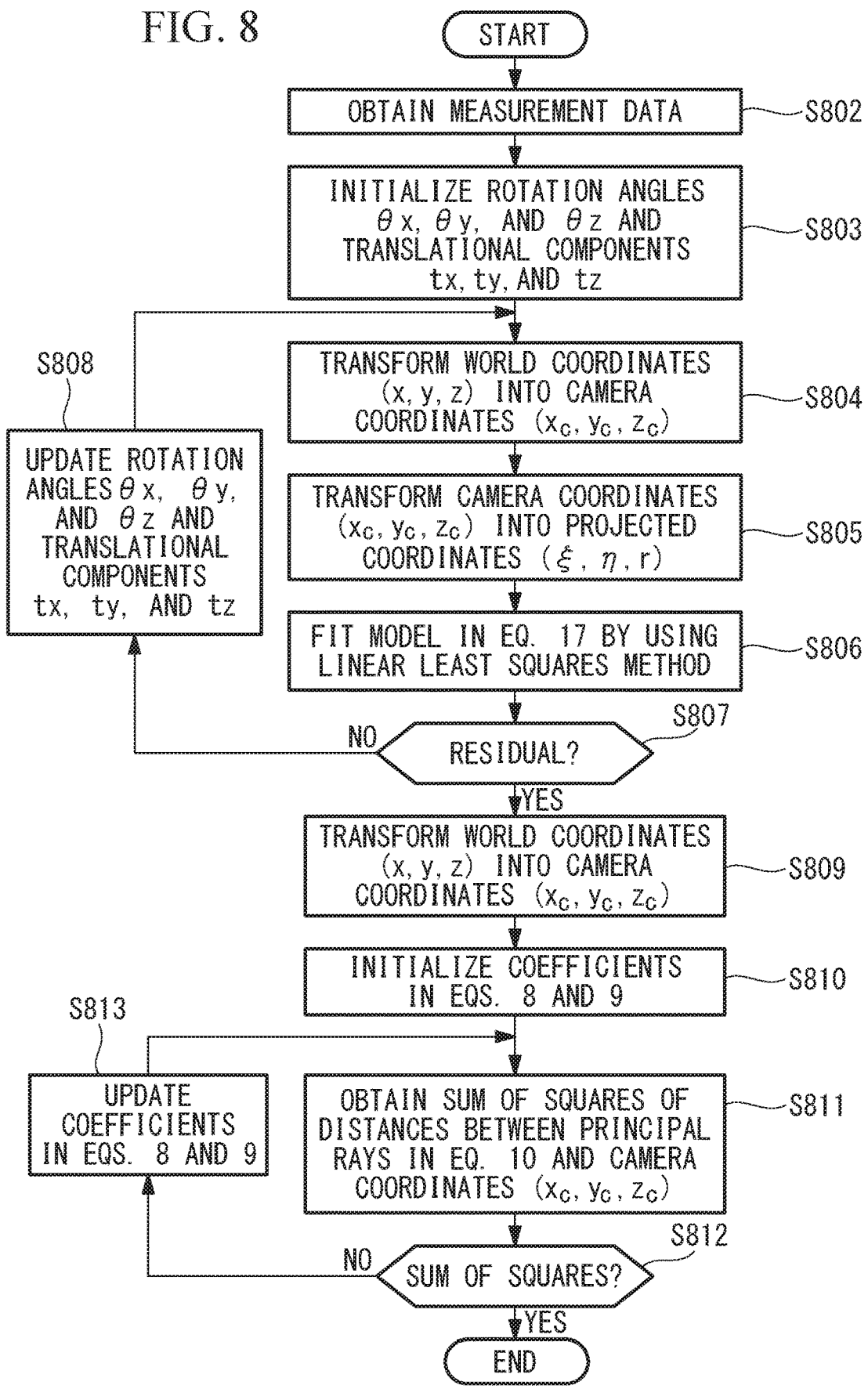
FIG. 8 shows a flowchart of a procedure for calibrating a camera by using a calibration device according to a second embodiment of the present invention.

Next, the procedure for calibrating a camera by using the camera calibration method according to the second embodiment will be described with reference to FIG. 8. First, similarly to the first embodiment, measurement data representing the correspondence between the world coordinates $(x, y, z)$ and the pixel coordinates $(u, v)$ is obtained (step S802).

Then, the rotation angles $\theta_x$, $\theta_y$, and $\theta_z$ and the translation components $t_x$, $t_y$, and $t_z$ included in Eq. 22 are initialized (step S803). Zero may be used as these initial values. Alternatively, if it is possible to estimate the rotation angles and translation of the camera 2 in some way, those values may be used as the initial values.

Then, the world coordinates $(x, y, z)$ of the measurement data are transformed into camera coordinates $(x_c, y_c, z_c)$ by using Eq. 22 (step S804). Furthermore, the camera coordinates $(x_c, y_c, z_c)$ are transformed into projected coordinates $(\xi, \eta, r)$ by using Eqs. 7 and 12 (step S805). Then, the camera model in Eq. 17 is fitted to all the pixel coordinates $(u, v)$ in the measurement data and the projected coordinates $(\xi, \eta, r)$ by using the linear least squares method (step S806). When the standard deviation of the resulting residuals is less than a predetermined value, the procedure proceeds to step S809. Otherwise, through the updating of the rotation angles $\theta_x$, $\theta_y$, and $\theta_z$ and the translation components $t_x$, $t_y$, and $t_z$ (step S808), the procedure returns to step S804 (step S807).

This iterative optimization is executed by using an ordinary optimization algorithm, such as the downhill simplex method. The rotation angles $\theta_x$, $\theta_y$, and $\theta_z$ and the translation components $t_x$, $t_y$, and $t_z$ with which the residual serving as an evaluation function is converged to the minimal value represent the optimal rotation angles and translation.

Then, all the world coordinates $(x, y, z)$ of the measurement data are transformed into camera coordinates $(x_c, y_c, z_c)$ by using Eq. 22 in which the abovementioned optimal rotation angles $\theta_x$, $\theta_y$, and $\theta_z$ and translation components $t_x$, $t_y$, and $t_z$ are applied (step S809). Furthermore, the coefficients $(k_0, k_1, p_1, p_2, \Delta u, \Delta v)$ in Eq. 8 and the coefficients $(k_0', k_1', p_1', p_2', \Delta u', \Delta v')$ in Eq. 9 are initialized respectively with the coefficients $(k_0, k_1, p_1, p_2, \Delta u, \Delta v)$ and $(k_0'', k_1'', p_1'', p_2'', \Delta u'', \Delta v'')$ in Eq. 17 for the optimal rotation angles and translation (step S810).

Then, the distance between the principal ray in Eq. 10 and the camera coordinates $(x_c, y_c, z_c)$, corresponding to pixel coordinates $(u, v)$, is calculated for all the measurement data, and the sum of squares of the calculated distances is obtained (step S811). When the sum of squares at this time is less than a predetermined value, the camera calibration is finished. Otherwise, through step S813 of updating the coefficients $(k_0, k_1, p_1, p_2, \Delta u, \Delta v)$ in Eq. 8 and the coefficients $(k_0', k_1', p_1', p_2', \Delta u', \Delta v')$ in Eq. 9, the procedure returns to step S811 (step S812).

This iterative optimization is executed by using the downhill simplex method or the alternate optimization algorithm described earlier. When the optimal rotation angles $\theta_x$, $\theta_y$, and $\theta_z$ and translation components $t_x$, $t_y$, and $t_z$, as well as the individual coefficients in the camera model for the rotation angles and translation, are obtained as described above, the camera calibration is finished.

Similarly to the first embodiment, it is possible to use the camera model in which the camera parameters obtained by using the camera calibration method according to this embodiment are set in a photographing device including the camera 2 having the camera model installed therein. However, the principal ray obtained from pixel coordinates of interest by using Eq. 10 is an equation at camera coordinates $(x_c, y_c, z_c)$. Depending on the application, there are cases where a principal ray in the world coordinates corresponding to pixel coordinates of interest is to be obtained. In such cases, a coordinate transformation unit (not shown) that transforms camera coordinates $(x_c, y_c, z_c)$ into world coordinates $(x, y, z)$ is included in a photographing device including the camera 2.

It is possible to realize this, for example, by employing the following procedure. First, camera coordinates $(x_{c1}, y_{c1})$ and $(x_{c2}, y_{c2})$ corresponding to pixel coordinates are obtained with two certain object distances $z_{c1}$ and $z_{c2}$ in the camera coordinates. As described in the context of the first embodiment, these camera coordinates are obtained as the intersections between the principal ray expressed in Eq. 10 and planes having the object distances $z_{c1}$ and $z_{c2}$. Then, the coordinate transformation unit transforms these two sets of camera coordinates $(x_{c1}, y_{c1}, z_{c1})$ and $(x_{c2}, y_{c2}, z_{c2})$ into world coordinates $(x_1, y_1, z_1)$ and $(x_2, y_2, z_2)$ by way of the inverse transformation in Eq. 22 using the optimal rotation angles $\theta_x$, $\theta_y$, and $\theta_z$ and translation components $t_x$, $t_y$, and $t_z$.

The straight line passing through the two points obtained by the transformation is the principal ray in the world coordinates.

In this embodiment, the three rotation angles $\theta_x$, $\theta_y$, and $\theta_z$ and the three translation components $t_x$, $t_y$, and $t_z$ are optimized. However, when some of these values are known, those values may be fixed to the known values and excluded from the parameters to be optimized. In this case, it suffices to optimize only the remaining unknown parameter or parameters. This results in a reduction in the number of parameters to be optimized, which serves to reduce the calculation time.

Note that the definitions of three rotation angles in three-dimensional coordinates involve arbitrariness. In the description of this embodiment, the rotation angles about the x, y, and z axes are adopted as the definitions. However, needless to say, it is possible to apply the present invention while using other definitions.

Furthermore, in the procedure adopted in this embodiment, the camera parameters of the camera model of the camera coordinates in Eq. 10 are subjected to iterative optimization, while using, as initial values, camera parameters obtained by fitting the camera model of the projected coordinate space in Eq. 17. However, similarly to the first embodiment, either one of these in the procedure may be omitted.

As described earlier, when the distance r of the range involved in camera calibration is sufficiently large, even if the iterative optimization of the model in Eq. 10 is omitted, it is possible to obtain the direction and intercept of a principal ray 19 with high accuracy from the model in Eq. 17.

Meanwhile, the following describes the procedure in which the initialization of the camera parameters with the camera model of the projected coordinate space in Eq. 17 is omitted in this embodiment. First, the world coordinates (x, y, z) in the measurement data are transformed into camera coordinates $(x_c, y_c, z_c)$ by using Eq. 22. Then, the rotation angles $\theta_x$, $\theta_y$, and $\theta_z$ and the translation components $t_x$, $t_y$, and $t_z$ included in the abovementioned Eq. 22 and the coefficients in Eqs. 8 and 9 are iteratively optimized so as to minimize the sum of squares of the distances between the principal rays in Eq. 10 corresponding to the pixel coordinates (u, v) in the measurement data and the abovementioned camera coordinates $(x_c, y_c, z_c)$.

With this procedure, since the number of parameters that are simultaneously subjected to iterative optimization increases, there is a high possibility of the occurrence of the problem of incorrect converged values or huge calculation time. However, it is possible to avoid the occurrence of such problems when the rotation angles $\theta_x$, $\theta_y$, and $\theta_z$ and the translation components $t_x$, $t_y$, and $t_z$ as well as the distortion aberration and pupil aberration of the camera to be calibrated are small or when it is possible to estimate the initial values of the individual parameters from the design data or the like of the camera.

As described above, with the camera calibration method according to this embodiment, it is possible to obtain a highly accurate camera model even in the case where the position and orientation of the camera 2 are not properly aligned in relation to the world coordinates. Furthermore, even in the case where a large number of camera parameters are required, such as distortion aberration, since the iterative optimization is executed by being divided into the procedure for optimizing three or fewer rotation angles and three or fewer translation components and the procedure for optimizing only the individual coefficients in the equation for a principal ray, the optimization of the camera model does not fail, and it is possible to considerably reduce the calculation time.

Next, a camera calibration device 32 and a camera calibration method according to a third embodiment of the present invention will be described below with reference to the drawings. The camera calibration device 32 according to this embodiment is applied to calibration of a multi-viewpoint camera 33, 34, 35 directed to shape restoration. Although the following description will be given in the context of an example of calibration of a multi-viewpoint camera constituted of three cameras, the present invention is also applicable to calibration of other numbers of cameras.

Figure 9:
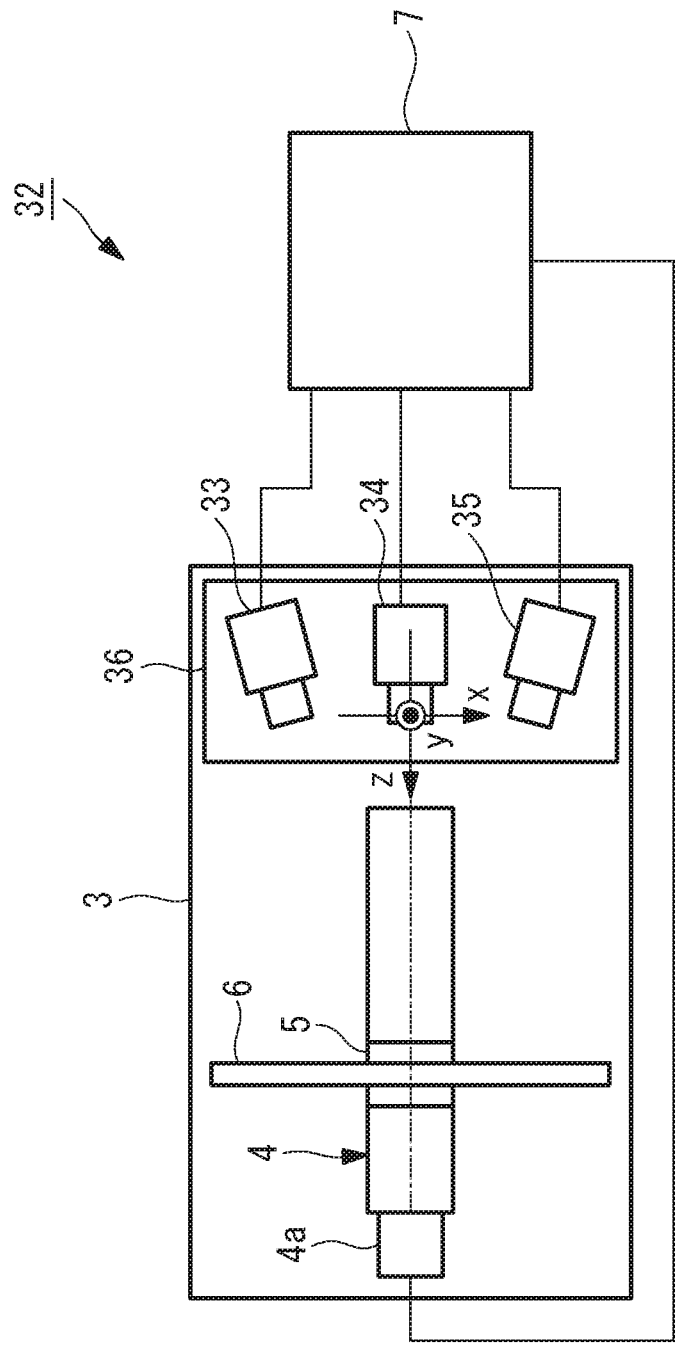
FIG. 9 is a plan view schematically showing a calibration device according to a third embodiment of the present invention.

As shown in FIG. 9, in the camera calibration device 32 according to this embodiment, the three cameras (photographing devices or optical devices) 33, 34, and 35 to be calibrated are secured to a camera securing table 36 with a layout matching the usage conditions of the multi-viewpoint camera. Then, the camera securing table 36 is attached to the camera calibration device 32 so that the individual cameras 33, 34, and 35 can capture images of the calibration chart 6. The configuration of the other parts, including the calibration chart 6, the z-axis moving stage 4, and the computer 7, is the same as that in FIG. 1, and thus a description thereof will be omitted.

The operation of the thus-configured camera calibration device 32 according to this embodiment will be described below. The camera calibration device 32 according to this embodiment operates in the same manner as the camera calibration device 1 according to the first embodiment. First, according to the measurement program in the flowchart in FIG. 3, images of the calibration chart 6 at a plurality of object distances are automatically captured by the cameras 33, 34, and 35, and the pixel coordinates of the lattice points 11 of the calibration chart 6 are obtained from the images.

Figure 3:
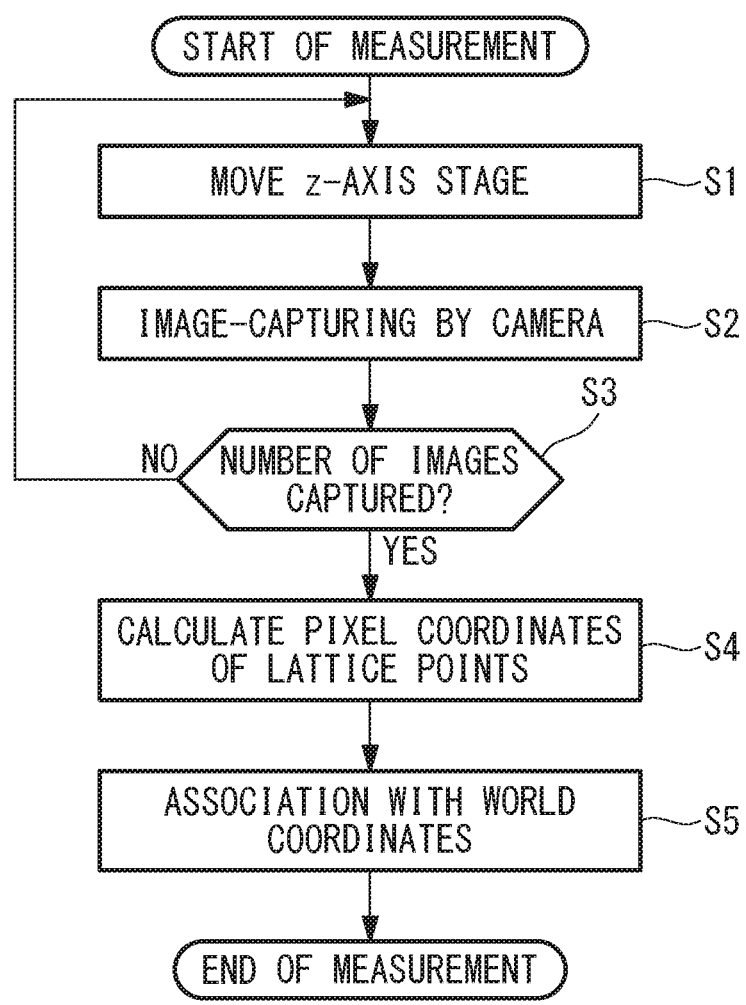
FIG. 3 shows a flowchart for explaining a calibration method executed by using the calibration device in FIG. 1.

Note, however, that steps S2, S4, and S5 in the flowchart in FIG. 3 are executed for each of the three cameras 33, 34, and 35.

Then, the camera models of the individual cameras 33, 34, and 35 are obtained from the abovementioned measurement data of the individual cameras 33, 34, and 35. The procedure for this purpose is the same as that in the second embodiment.

Similarly to the first and second embodiments, it is possible to use the individual camera models in which the camera parameters obtained by the camera calibration device 32 according to this embodiment are set in a photographing device including the cameras 33, 34, and 35 having the individual camera models installed therein. In particular, in the case of an application in which the principal rays corresponding to the individual pixel coordinates of the cameras 33, 34, and 25 are to be handled with a single common world coordinate system, the procedure of the coordinate transformation unit, described in the context of the second embodiment, should be applied.

Note that it is not necessarily required to simultaneously obtain measurement data for the individual cameras 33, 34, and 35 constituting multiple viewpoints. For example, the measurement program in the flowchart in FIG. 3 may be executed individually and sequentially for the individual cameras. Furthermore, when obtaining measurement data for the individual cameras 33, 34, and 35, the position where the z-axis moving stage 4 is set on the camera calibration device 32 may be changed such that the calibration chart 6 squarely faces each of the cameras subject to measurement.

Note, however, that it is necessary to ascertain the amount of change in the set position and to create measurement data while reflecting the amount of change in the world coordinates of the lattice points of the calibration chart 6. This camera calibration method is effective in the case where there is a camera that cannot capture an image of the calibration chart 6 that is secured in one direction because the multi-viewpoint camera 33, 34, and 35 are disposed so as to surround the observation area.

As described above, with the camera calibration device 32 and the camera calibration method according to this embodiment, it is possible to calibrate the multi-viewpoint camera 33, 34, and 35 in a layout matching the usage conditions. Furthermore, an advantage is afforded in that it is possible to handle world coordinates or principal rays corresponding to the pixel coordinates of the individual cameras 33, 34, and 35 in a single common world coordinate system.

Next, a measurement system and a measurement method according to an embodiment of the present invention will be described with reference to the drawings.

As shown in FIG. 9, the measurement system according to this embodiment includes the camera calibration device 32 according to the third embodiment, the multi-viewpoint camera 33, 34, and 35, and a three-dimensional coordinate calculation processing unit (the computer 7).

Camera calibration is executed by the camera calibration device 32 to obtain camera models in which the individual camera parameters for the multi-viewpoint camera 33, 34, and 35 are set.

Figure 11:
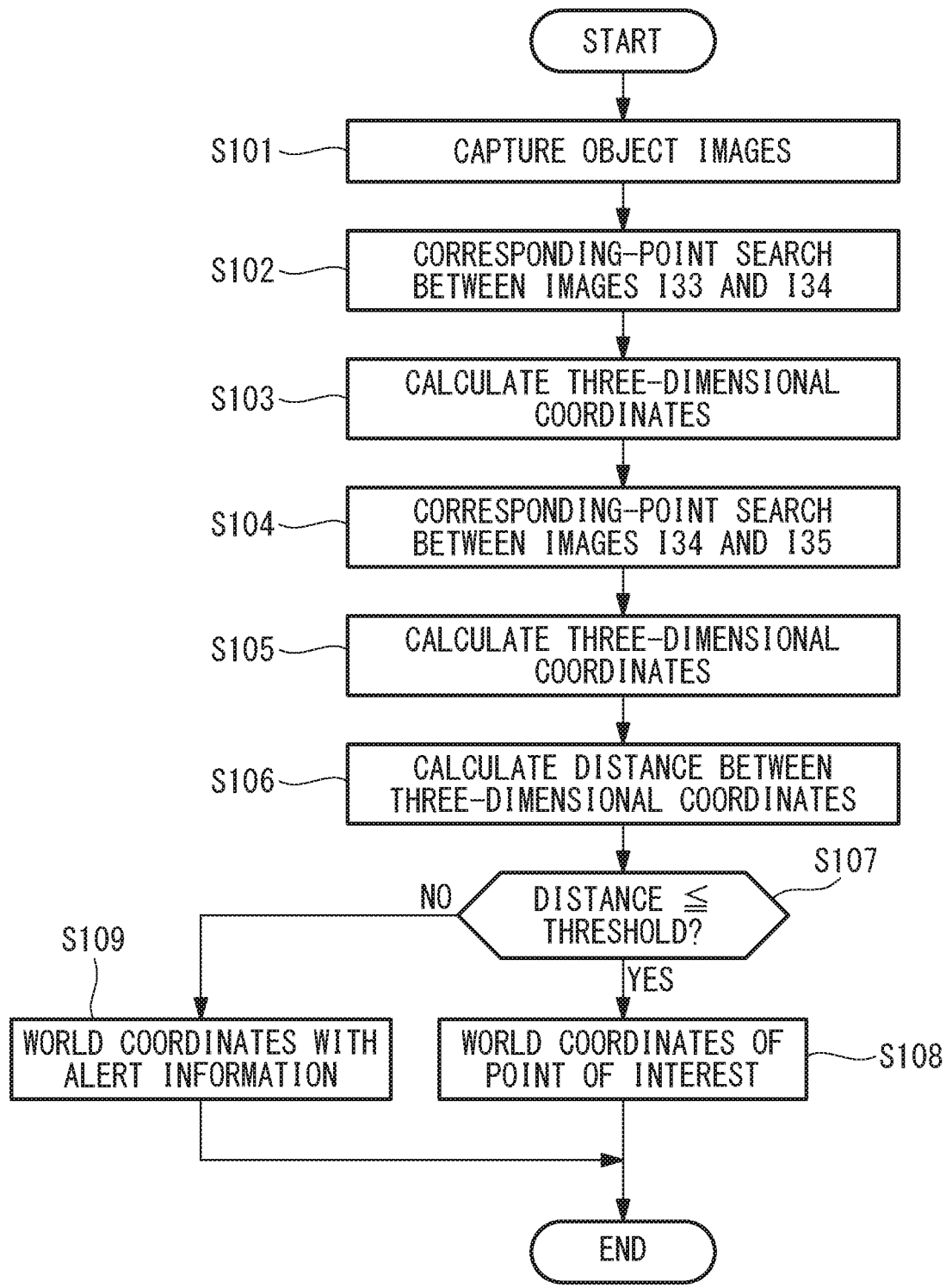
FIG. 11 shows a flowchart of a measurement method according to an embodiment of the present invention.

Through the calculation processing constituted of the following steps, the three-dimensional calculation processing unit included in the computer 7 calculates the world coordinates of a point of interest on the surface of an object photographed by the multi-viewpoint camera 33, 34, and 35. The procedure for this purpose is shown in FIG. 11.

Step S101: Three object images I33, I34, and I35 captured by the multi-viewpoint camera 33, 34, and 35 are loaded.

Step S102: Through corresponding-point search processing, the pixel coordinates of pixels in I33 corresponding to the pixel coordinates of individual pixels designated by the user in the image I34 are obtained.

Step S103: Simultaneous equations of the principal ray corresponding to the pixel coordinates designated in I34 and the principal ray corresponding to the pixel coordinates in I33 obtained in step S102 are solved to obtain world coordinates A of the points of interest on the object surface corresponding to the individual pixels in the image I34.

Step S104: Through corresponding-point search processing, the pixel coordinates of the pixels in the image I35 corresponding to the individual pixels in the image I34 are obtained.

Step S105: Simultaneous equations of the principal ray corresponding to the pixel coordinates designated in I34 and the principal ray corresponding to the pixel coordinates in I35 obtained in step S104 are solved to obtain world coordinates B of the points of interest on the object surface corresponding to the individual pixels in the image I34.

Step S106: The point-to-point distance D1 between the world coordinates A and B is obtained for each of the pixels in the image I34.

Step S107: For each of the pixels in the image I34, it is determined whether or not the point-to-point distance D1 is less than or equal to a predetermined threshold.

Step S108: If the point-to-point distance D1 is less than or equal to the threshold, it is considered that the world coordinates A and B both involve only little error, and the coordinates of the midpoint of the two world coordinates A and B is considered as the world coordinates of the corresponding point of interest on the object surface.

Step S109: In the case where the point-to-point distance D1 is greater than the threshold, the corresponding point of interest on the object surface is considered as being "not available", or alert information indicating that the error is large is attached to the world coordinates of the corresponding point of interest.

For the corresponding-point search processing between images, an algorithm for evaluating the degree of similarity in the distribution of image luminance values, such as block matching, is used. As the method of calculating the degree of similarity, it is possible to use one of a plurality of calculation methods depending on the requirements of the calculation speed and calculation precision, such as the square sum of differences (SSD), the sum of absolute differences (SAD), normalized cross correlation (NCC), and zero-mean normalized cross correlation. ZNCC is desirable considering the robustness against the differences in brightness among the images individually captured by the cameras 33, 34, and 35. Furthermore, it may be allowed to choose from the plurality of methods of calculating the degree of similarity in consideration of the balance with the calculation time.

Furthermore, it is desired to apply the distortion correction processing described in the context of the first embodiment to the images I33, I34, and I35 used in the corresponding-point search processing. By executing the corresponding-point search processing on the images that have been subjected to the distortion correction processing, it is possible to obtain even more accurate coordinates of the corresponding point, in which the effects of the differences in the optical characteristics among the cameras 33, 34, and 35 are reduced.

In step S105, the simultaneous equations are solved by first using the equation of the x and z components of the principal ray, and y is obtained by using the obtained value of z. In the equation for obtaining y, the principal ray of the image I34 used to designate a pixel is used.

In step S108, an effect of further reducing the error in the world coordinates to be obtained by using the world coordinates of the midpoint of the two world coordinates A and B.

Although a three-viewpoint camera is used as an example here, a two-viewpoint camera may be used. In that case, the processing in and after step S104 described above becomes unnecessary.

Note that although world coordinates are calculated for pixels designated by the user in the image I34 in the description of each step, world coordinates may be automatically calculated for a plurality of pixels determined as being characteristic as a result of feature-point extraction processing executed on the image I34, or world coordinates may be calculated for all the pixels in the image I34 in the case where there are only small restrictions on calculation resources.

Figure 10:
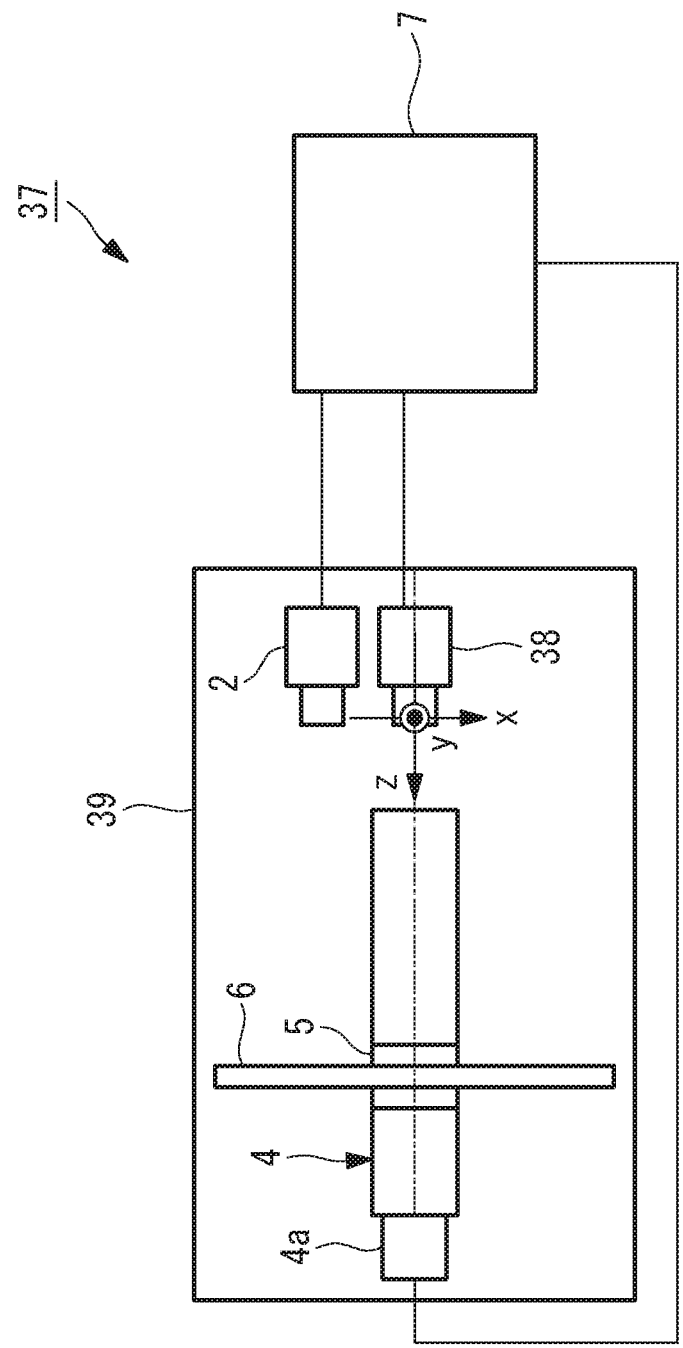
FIG. 10 is a plan view schematically showing a calibration device according to a fourth embodiment of the present invention.

Next, a calibration device according to a fourth embodiment of the present invention will be described below with reference to FIG. 10. The calibration device according to this embodiment is a projector calibration device 37. The calibration device internally includes an image forming element (image conversion element: not shown), such as a liquid crystal element, and a projection optical system (optical system: not shown), constituting a device for calibrating a projector (projection device) 38 that projects the formed image to the outside. In this embodiment, the projector 38 is used as an example of an optical device.

The projector calibration device 37 includes a base 39 to which the projector 38 to be calibrated is secured; a z-axis moving stage 4 provided on the base 39; a calibration chart 6 fixed to a movable part 5 of the z-axis moving stage 4; and a camera 2 that is disposed at a position adjacent to the projector 38 and that captures an image of the calibration chart 6. The camera 2 and the projector 38 are attached to the projector calibration device 37 such that the optical axes of these devices become parallel to the z axis of the projector calibration device 37 and such that a predetermined position of the projector 38 coincides with the coordinate origin.

Note that the imaging range of the camera 2 should preferably encompass the image projection range of the projector 38. The configuration of the other parts, such as the calibration chart 6, the z-axis moving stage 4, and the computer 7, is the same as that in FIG. 1. However, as the calibration chart 6 used in this embodiment, it is possible to replace the chessboard 10 in FIG. 2 and a plain screen with each other. Furthermore, the computer 7 also has a function for controlling the projector 38 so as to cause the projector 38 to project a predetermined image.

In order to calibrate the projector 38 by using the thus-configured projector calibration device 37 according to this embodiment, first, the camera 2 is calibrated in the state where the chessboard 10 in FIG. 2 is installed as the calibration chart 6. The procedure for this purpose is the same as that in the first or second embodiment.

Then, the calibration chart 6 is replaced with the plain screen. Then, the pattern of the chessboard 10 in FIG. 2 is projected from the projector 38 onto the calibration chart 6 through the projection optical system. At this time, the pixel coordinates of the individual lattice points 11 and 13 on the chessboard 10 are known in the pixel coordinates defined on the image-forming element (not shown) inside the projector 38.

In this state, similarly to the first embodiment, according to the measurement program in the flowchart in FIG. 3, images of the calibration chart 6 on which the pattern of the chessboard 10 is projected at a plurality of object distances are automatically captured by the camera 2, and the pixel coordinates of the lattice points 11 of the pattern of the chessboard 10 are obtained from the images.

Then, from the obtained pixel coordinates (u, v) and the object distances z of the calibration chart 6, the world coordinates (x, y) of the lattice points 11 of the chessboard 10 projected onto the calibration chart 6 are obtained by using the camera model of the camera 2 calibrated by using the procedure described earlier. With the procedure described above, measurement data representing the correspondence between the pixel coordinates (u, v) and the world coordinates (x, y, z) of the projector 38 is obtained. The method of obtaining the camera parameters of the projector 38 from the measurement data is the same as that in the first or second embodiment.

Similarly to the first and second embodiments, it is possible to use the camera model in which the thus-obtained camera parameters of the projector 38 are set in the projector 38 having the camera model installed therein.

In particular, when an image free of distortion is to be projected, image distortion that cancels out distortion that occurs by projection should be added in advance to an image that is formed by the image-forming element of the projector 38. The procedure for obtaining the pixel coordinates of such a distortion-corrected image is the same as that in the flowchart for the first embodiment shown in FIG. 7.

The pattern that is projected by the projector 38 is not limited to the pattern of the chessboard 10. It is also possible to adopt a pattern, such as dot marks, that makes it possible to calculate the pixel coordinates of feature points from images captured by the camera 2. Alternatively, a method in which discrete pixels of the projector 38 are individually turned on may be employed.

Furthermore, in this embodiment, the world coordinates (x, y) of the feature points projected by the projector 38 are measured by the camera 2 calibrated in advance. This measurement is also possible by using a method in which the image-capturing element 18 is installed instead of the calibration chart 6 and in which images of the projected pattern are directly captured. Furthermore, other acquisition methods may be chosen as long as it is possible to clarify the correspondence between world coordinates and pixel coordinates. As described above, with the projector calibration device 37 according to this embodiment, it is possible to calibrate the projector 38 by using a camera model.

Next, a measurement system and a measurement method according to an embodiment of the present invention will be described with reference to the drawings.

The measurement system according to this embodiment includes the projector calibration device 37 according to the fourth embodiment, the projector 38, and a three-dimensional coordinate calculation processing unit (the computer 7).

By executing calibration of the projector 38 by using the projector calibration device 37, a camera model in which the camera parameters of the projector 38 are set is obtained. By executing the camera calibration in the first or second embodiment on the camera 2 in the fourth embodiment, a camera model in which the camera parameters of the camera 2 are set is obtained.

As the pattern that is projected by the projector 38, a random-dot pattern image I38 is used. The three-dimensional calculation processing unit included in the computer 7, through the calculation processing constituted of the following steps, calculates the world coordinates of a point of interest on the surface of the object photographed by the camera 2. It is possible to generate the random dot pattern by using a known method. Alternatively, the random dot pattern may be generated by two-dimensionally arraying pseudo-random number sequences, such as M-sequences.

Figure 12:
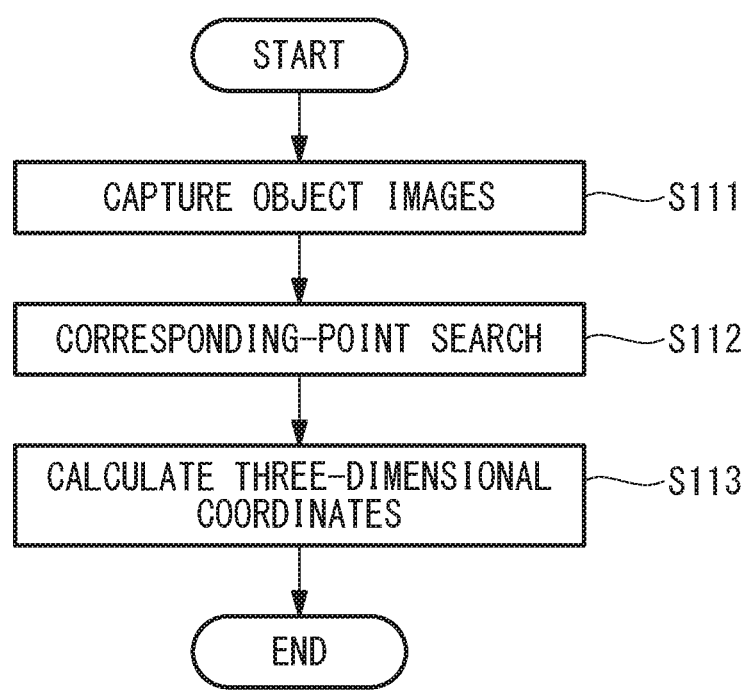
FIG. 12 shows a flowchart of a measurement method according to another embodiment of the present invention.

The measurement method is shown in FIG. 12.

Step S111: An object image I2 obtained by photographing, by using the camera 2, an object onto which a pattern (structured light) is projected by the projector 38 is captured.

Step S112: Through corresponding-point search processing, the pixel coordinates of pixels in the image I38 corresponding to the individual pixels designated by the user in the image I2 are obtained.

Step S113: Simultaneous equations of the principal ray corresponding to the pixel coordinates designated in I2 and the principal ray corresponding to the pixel coordinates in I38 obtained in step S112 are solved to obtain the world coordinates of the points of interest on the object surface corresponding to the individual pixels in the image I2.

In step S113, the simultaneous equations are solved by first using the equation of the x and z components of the principal ray, and y is obtained by using the obtained value of z. In the equation for obtaining y, the principal ray of I2 used to designate a pixel is used.

In the example described here, the projector 38 projects one kind of pseudo-random pattern as a pattern. However, the method used may be a phase shift method in which a plurality of object images onto which a plurality of stripes having varied phases are projected with time differences are used or a spatial coding method in which a plurality of images onto which binary patterns having a plurality of resolutions are projected are used. Furthermore, although only one projector 38 is used in the example described above, a plurality of projectors 38 may be provided for a single camera 2, or a plurality of projectors 38 may be provided for a plurality of cameras 2.

Note that although world coordinates are calculated for each pixel designated by the user in the image I2 in the description of each step, three-dimensional coordinates may be automatically calculated for a plurality of pixels determined as being characteristic as a result of feature-point extraction processing executed on the image I2, or three-dimensional coordinates may be calculated for all the pixels in the image I2 in the case where there are only small restrictions about calculation resources.

Next, a camera calibration method according to a fifth embodiment of the present invention will be described below with reference to FIGS. 1, 4A to 4C, and 5A and 5B.

The camera calibration methods described in the context of the first to fourth embodiments are methods for the case where the pupil aberration of the camera 2 to be calibrated is not negligible. The camera calibration method described in the context of this embodiment is a method for the case where the pupil aberration is negligible.

The pupil aberration of the camera 2 being negligible is equivalent to all the principal rays intersecting the entrance pupil at the single point at the center 404 thereof. Therefore, it is possible to calibrate the camera 2 just with the principal-ray direction model in Eq. 8. That is, when the camera coordinates $(x_c, y_c, z_c)$ of the lattice points 11 are trans-formed into projected coordinates $(\xi, \eta')$ in Eq. 23 via the spherical coordinates $(r, \theta, \varphi)$ in Eq. 7, the camera model in Eq. 24 holds.

$$\begin{pmatrix} \xi' \\ \eta' \end{pmatrix} = P(\theta)\begin{pmatrix} \cos\varphi \\ \sin\varphi \end{pmatrix} \quad \{Eq.\ 23\}$$

$$\begin{pmatrix} \xi' \\ \eta' \end{pmatrix} =$$

$$k_0\begin{pmatrix} u \\ v \end{pmatrix} + k_1\rho^2\begin{pmatrix} u \\ v \end{pmatrix} + p_1\begin{pmatrix} \rho^2 + 2u^2 \\ 2uv \end{pmatrix} + p_2\begin{pmatrix} 2uv \\ \rho^2 + 2v^2 \end{pmatrix} + \begin{pmatrix} \Delta u \\ \Delta v \end{pmatrix} \quad \{Eq.\ 24\}$$

Next, the procedure for optimizing a camera model by using the camera calibration method according to the fifth embodiment will be described.

First, similarly to the first embodiment, measurement data representing the correspondence between the world coordinates (x, y, z) and the pixel coordinates (u, v) is obtained. Then, the world coordinates (x, y, z) of the measurement data are transformed into camera coordinates $(x_c, y_c, z_c)$ by using Eq. 22. Furthermore, the camera coordinates $(x_c, y_c, z_c)$ are transformed into projected coordinates $(\xi', \eta')$ by using Eqs. 7 and 23.

Then, the camera model in Eq. 24 is fitted to all the pixel coordinates (u, v) of the measurement data and the projected coordinates $(\xi', \eta')$ by using the linear least squares method. By using the standard deviation of the residuals at that time as an evaluation function, the rotation angles $\theta_x$, $\theta_y$, and $\theta_z$ and the translation components $t_x$, $t_y$, and $t_z$ included in Eq. 22 mentioned earlier are iteratively optimized. The initial values of the rotation angles $\theta_x$, $\theta_y$, and $\theta_z$ and the translation components $t_x$, $t_y$, and $t_z$ serving as the optimization parameters may be zero. Alternatively, when it is possible to estimate the rotation angles and translation of the camera 2 in some way, the estimated values may be used as the initial values.

This iterative optimization is executed by using an ordinary optimization algorithm, such as the downhill simplex method. The rotation angles $\theta_x$, $\theta_y$, and $\theta_z$ and the translation components $t_x$, $t_y$, and $t_z$ at the time when the evaluation function is converged to the minimal value are the optimal rotation angles and translation, and the individual coefficients of the camera model in Eq. 24 at that time are the camera parameters. Then, the camera calibration is finished.

Similarly to the first to fourth embodiments, it is possible to use the camera model in which the camera parameters obtained by using the camera calibration method according to this embodiment are set in a photographing device including the camera 2 having the camera model installed therein or in the projector 38.

As described above, with the camera calibration method according to this embodiment, it is possible to reduce the number of camera parameters in the case where it is possible to disregard the pupil aberration with the camera 2 or the projector 38 to be calibrated. Furthermore, since the number of iterative optimization parameters is limited to three or fewer rotation angles and three or fewer translation components even in the case where a large number of camera parameters, such as distortion aberration, are required, the optimization of the camera model does not fail, and it is possible to considerably reduce the calculation time.

Furthermore, in the first to fifth embodiments of the present invention, the camera 2 or the projector 38 is not limited to a refractive optical system. It would be obvious that it is also possible to apply the present invention to a catadioptric optical system if transformation such as the inversion of the coordinate system due to reflection is taken into consideration.

Furthermore, a plurality of camera calibrations individually corresponding to setting changes of the focus, zoom, diaphragm, etc. of the camera 2 or the projector 38 may be executed. Furthermore, a camera model corresponding to an arbitrary setting may be obtained by interpolating those camera models.

Furthermore, camera calibration may be executed under a plurality of wavelengths of a light source. Furthermore, camera models for individual wavelengths may be used for a camera that captures images of individual wavelengths. Furthermore, although the image-capturing element 18 or an image-forming element is used as an example of an image conversion element in the optical devices 2, 33, 34, 35, and 38 described in the context of the first to fifth embodiments of the present invention, any image conversion element that performs mutual conversion between images and video signals may be adopted, without limitation to the imaging element 18 or an image-forming element.

As a result, the above-described embodiments lead to the following aspects.

One aspect of the present invention provides a calibration device for an optical device including a two-dimensional image conversion element having a plurality of pixels and including an optical system that forms an image-forming relationship between the image conversion element and a three-dimensional world coordinate space, the calibration device including a calibration-data obtaining unit that obtains calibration data representing the correspondence between two-dimensional pixel coordinates of the image conversion element and three-dimensional world coordinates of the world coordinate space; and a parameter calculating unit that fits a camera model representing the direction of a principal ray in the world coordinate space, corresponding to the pixel coordinates, as a function of the pixel coordinates, to the calibration data obtained by the calibration-data obtaining unit, thereby calculating parameters of the camera model.

In the above aspect, when the projective relationship between the angle of view $\theta$ and the image height y is substantially expressed by $y=fP(\theta)$ using the focal length f of projection, the parameter calculating unit may fit the camera model representing, as a function of the pixel coordinates, two-dimensional coordinates ($P(\theta)\cos \varphi$, $P(\theta)\sin \varphi$) obtained by transforming three-dimensional world coordinates (x, y, z) in the calibration data obtained by the calibration-data obtaining unit on the basis of three-dimensional spherical coordinates (r, $\theta$, $\varphi$) that are equal to the world coordinates.

In the above aspect, the parameter calculating unit may fit the camera model representing, as functions of the pixel coordinates, the direction of the principal ray and the coordinates of a point that the principal ray passes through.

In the above aspect, the parameter calculating unit may fit the camera model representing, as a function of the pixel coordinates, the coordinates of a point that the principal ray passes through, dictated by two-dimensional coordinates, in a plane orthogonal to the direction of the principal ray, at the intersection between the plane and the principal ray.

In the above aspect, the plane may pass through the center of an entrance pupil of the optical system.

In the above aspect, the parameter calculating unit may fit the camera model to the calibration data by alternately updating a model representing the direction of the principal ray as a function of the pixel coordinates and a model representing, as a function of the pixel coordinates, the coordinates of a point that the principal ray passes through.

In the above aspect, the parameter calculating unit may fit a model of a straight line, represented as a function of the pixel coordinates, to a distribution of residuals of the calibration data in relation to the camera model, and may update, on the basis of an intercept parameter in the model of the straight line, parameters of the model representing, as the function of the pixel coordinates, the coordinates of the point that the principal ray passes through.

Alternatively, the parameter calculating unit may obtain data representing the direction of world coordinates in the calibration data in relation to the coordinates of the point that the principal ray passes through, obtained according to the camera model from the pixel coordinates in the calibration data, and may fit a model representing the direction of the principal ray as a function of the pixel coordinates to the data, thereby updating parameters of the model.

In the above aspect, when the projective relationship between the angle of view $\theta$ and the image height y is substantially expressed by $y=fP(\theta)$ using the focal length f of projection, the parameter calculating unit may transform three-dimensional world coordinates (x, y, z) in the calibration data obtained by the calibration-data obtaining unit into three-dimensional coordinates ($rP(\theta)\cos \varphi$, $rP(\theta)\sin \varphi$, r) on the basis of three-dimensional spherical coordinates (r, $\theta$, $\varphi$) that are equal to the world coordinates, and may then fit a camera model representing a straight line in the transformed coordinate system as a function of the pixel coordinates.

In the above aspect, the parameter calculating unit may fit a camera model representing the slope and the intercept of the straight line individually as two-dimensional functions of the pixel coordinates, the straight line being dictated by the slope thereof in relation to the r axis of the transformed coordinate system and the intercept thereof constituting the intersection with a plane perpendicular to the r axis.

In the above aspect, the function of the pixel coordinates may have the same form as a function representing an image-forming relationship between two-dimensional planes.

In the above aspect, the function representing the image-forming relationship between the two-dimensional planes may be represented by a linear sum of a plurality of two-dimensional vectors of the image coordinates.

In the above aspect, the parameter calculating unit may fit the camera model to the calibration data by using the linear least squares method.

In the above aspect, the parameter calculating unit may include a parameter calculating unit that sets, on the basis of parameters obtained by fitting the camera model representing the straight line in the transformed coordinates ($rP(\theta)\cos \varphi$, $rP(\theta)\sin \varphi$, r) as a function of the pixel coordinates, initial values of camera parameters of a camera model representing the direction of the principal ray and the coordinates of a point that the principal ray passes through individually as functions of the pixel coordinates, and that then iteratively optimizes the camera model, thereby calculating the parameters of the camera model.

In the above aspect, the parameter calculating unit may fit the camera model to calibration data obtained by transforming three-dimensional world coordinates in the calibration data obtained by the calibration-data obtaining unit into world coordinates rotated by one or more rotation angles among three rotation angles representing rotations of the world coordinates, thereby obtaining one or more rotation angles that minimize the residual of the camera model.

In the above aspect, the parameter calculating unit may fit the camera model to calibration data obtained by transforming three-dimensional world coordinates in the calibration data obtained by the calibration-data obtaining unit into world coordinates translated by one or more components among three translation components representing translations of the world coordinates, thereby obtaining one or more translation components that minimize the residual of the camera model.

In the above aspect, the optical device may include a plurality of image conversion elements and an optical system that forms an image-forming relationship between the image conversion elements and a three-dimensional world coordinate space, the calibration-data obtaining unit may obtain the calibration data of the individual image conversion elements and the optical system, and the parameter calculating unit may fit the camera models represented as functions of two-dimensional pixel coordinates of the individual image conversion elements to the calibration data of the individual image conversion elements and the optical system.

In the above aspect, the optical device may be a photographing device, the image conversion element may be an image-capturing element, and the optical system may be an image-capturing optical system.

Alternatively, in the above aspect, the optical device may be a projecting device, the image conversion element may be an image-forming element, and the optical system may be a projection optical system.

Another aspect of the present invention provides an optical device having installed therein the camera model in which the parameters calculated by one of the calibration devices described above.

In the above aspect, the camera model may be saved as discrete data representing the correspondence between a plurality of pixel coordinates and world coordinates on two planes or curved surfaces.

Alternatively, in the above aspect, the camera model may be saved as discrete data representing the correspondence between a plurality of pixel coordinates and the directions and intercepts of principal rays in the world coordinate space.

In the above aspect, the optical device may include a principal-ray calculating unit that obtains a principal ray in the world coordinate space, corresponding to the pixel coordinates, from two coordinate values of the pixel coordinates according to the camera model.

In the above aspect, the optical device may include a world-coordinate calculating unit that obtains three coordinate values of world coordinates as an intersection between the principal ray in the world coordinate space, corresponding to the pixel coordinates and obtained according to the camera model, and a plane or curved surface given in the three-dimensional world coordinate space.

In the above aspect, the optical device may include a distortion-corrected-image generating unit that obtains, according to the camera model, the world coordinates corresponding to pixel coordinates of an image acquired or formed by the image conversion element, thereby generating an image in which distortion has been corrected.

Another aspect of the present invention provides an optical device having installed therein a camera model in which the rotation angles obtained by the calibration device described above are set as camera parameters.

Another aspect of the present invention provides an optical device having installed therein a camera model in which the translation components obtained by the calibration device described above are set as camera parameters.

In the above aspect, the optical device may include a coordinate transformation unit that mutually transforms camera coordinates and world coordinates on the basis of the rotation angles and the translation components.

Another aspect of the present invention provides a photographing device constituted of one of the optical devices described above.

Another aspect of the present invention provides a projecting device constituted of one of the optical devices described above.

Another aspect of the present invention provides a measurement system including the calibration device described above; one or more photographing devices; and a three-dimensional-coordinate calculation processing unit that calculates three-dimensional coordinates of a point of interest of an object from pixel coordinates of images acquired by the photographing devices from a plurality of viewpoints, wherein the three-dimensional-coordinate calculation processing unit uses the camera model used in the calibration device, the parameters of the camera models of the photographing devices, calculated by the calibration device, and rotation angles and/or translation components of the photographing devices.

Another aspect of the present invention provides a measurement system including the calibration device described above; one or more photographing devices; one or more projecting devices; and a three-dimensional-coordinate calculation processing unit that calculates three-dimensional coordinates of a point of interest of an object onto which structured light from the projecting devices is projected, from pixel coordinates of images of the object captured by the photographing devices, wherein the three-dimensional-coordinate calculation processing unit uses the camera model used in the calibration device, the parameters of the camera models of the photographing devices, calculated by the calibration device, rotation angles and/or translation components of the photographing devices, the parameters of the camera models of the projecting devices, calculated by the calibration device, and rotation angles and/or translation components of the projecting devices.

Another aspect of the present invention provides a calibration method including a step of obtaining calibration data for an optical device including a two-dimensional image conversion element having a plurality of pixels and including an optical system that forms an image-forming relationship between the image conversion element and a three-dimensional world coordinate space, the calibration data representing the correspondence between two-dimensional pixel coordinates of the image conversion element and three-dimensional world coordinates of the world coordinate space; and a step of fitting, on the basis of the obtained calibration data, a camera model representing, as a function of the pixel coordinates, the direction of a principal ray in the world coordinate space, corresponding to the pixel coordinates, thereby calculating parameters of the camera model.

Another aspect of the present invention provides a measurement method including a step of obtaining calibration data for a photographing device including a two-dimensional image conversion element having a plurality of pixels and including an optical system that forms an image-forming relationship between the image conversion element and a three-dimensional world coordinate space, the calibration data representing the correspondence between two-dimensional pixel coordinates of the image conversion element and three-dimensional world coordinates of the world coordinate space; a step of fitting, on the basis of the obtained calibration data, a camera model representing, as a function of the pixel coordinates, the direction of a principal ray in the world coordinate space, corresponding to the pixel coordinates, thereby calculating parameters of the camera model; and a step of calculating three-dimensional coordinates of a point of interest of an object from pixel coordinates of images from a plurality of viewpoints by using the calculated parameters, the camera model used to calculate the parameters, and rotation angles and/or translation components of the photographing device.

Another aspect of the present invention provides a measurement method including a step of obtaining calibration data for a photographing device and a projecting device each including a two-dimensional image conversion element having a plurality of pixels and including an optical system that forms an image-forming relationship between the image conversion element and a three-dimensional world coordinate space, the calibration data representing the correspondence between two-dimensional pixel coordinates of the image conversion element and three-dimensional world coordinates of the world coordinate space; a step of fitting, on the basis of the obtained calibration data, a camera model representing, as a function of the pixel coordinates, the direction of a principal ray in the world coordinate space, corresponding to the pixel coordinates, thereby calculating parameters of the camera model; and a step of calculating three-dimensional coordinates of a point of interest of an object from pixel coordinates of images from pixel coordinates from a plurality of viewpoints in images, captured by the photographing device, of the object onto which structured light from the projecting device is projected, by using the calculated parameters, the camera model used to calculate the parameters, and rotation angles and/or translation components of the photographing device.

According to the present invention, an advantage is afforded in that it is possible to accurately obtain camera parameters of a camera having a large angle of view in a short time.

REFERENCE SIGNS LIST 1, 32 Camera calibration device (calibration device)
2, 33, 34, 35 Camera (photographing device, optical device)
7 Computer (parameter calculating unit, three-dimensional-coordinate calculation processing unit
8 Calibration-data obtaining unit
14 Image-capturing optical system (optical system)
18 Image-capturing element (image conversion element
37 Projector calibration device (calibration device)
38 Projector (projection device, optical device)

The invention claimed is:

1. A calibration device for an optical device including a two-dimensional image conversion element having a plurality of pixels and including an optical system that forms an image-forming relationship between the image conversion element and a three-dimensional world coordinate space, the calibration device comprising:
a computer, wherein the computer is configured to:
obtain calibration data representing the correspondence between two-dimensional pixel coordinates of the image conversion element and three-dimensional world coordinates of the world coordinate space; and
fit a camera model representing the direction of a principal ray in the world coordinate space, corresponding to the pixel coordinates, as a function of the pixel coordinates, to the calibration data obtained, thereby calculating parameters of the camera model.

2. A calibration device according to claim 1, wherein, when the projective relationship between the angle of view $\theta$ and the image height y is substantially expressed by $y=fP(\theta)$ using the focal length f of projection, the calculating of the parameters fits the camera model representing, as a function of the pixel coordinates, two-dimensional coordinates $(P(\theta)\cos \varphi, P(\theta)\sin \varphi)$ obtained by transforming three-dimensional world coordinates (x, y, z) in the calibration data obtained on the basis of three-dimensional spherical coordinates $(r, \theta, \varphi)$ that are equal to the world coordinates.

3. A calibration device according to claim 1, wherein the calculating of the parameters fits the camera model representing, as functions of the pixel coordinates, the direction of the principal ray and the coordinates of a point that the principal ray passes through.

4. A calibration device according to claim 3, wherein the calculating of the parameters fits the camera model representing, as a function of the pixel coordinates, the coordinates of a point that the principal ray passes through, dictated by two-dimensional coordinates, in a plane orthogonal to the direction of the principal ray, at the intersection between the plane and the principal ray.

5. A calibration device according to claim 4, wherein the plane passes through the center of an entrance pupil of the optical system.

6. A calibration device according to claim 3, wherein the calculating of the parameters fits the camera model to the calibration data by alternately updating a model representing the direction of the principal ray as a function of the pixel coordinates and a model representing, as a function of the pixel coordinates, the coordinates of a point that the principal ray passes through.

7. A calibration device according to claim 6, wherein the calculating of the parameters fits a model of a straight line, represented as a function of the pixel coordinates, to a distribution of residuals of the calibration data in relation to the camera model, and updates, on the basis of an intercept parameter in the model of the straight line, parameters of the model representing, as the function of the pixel coordinates, the coordinates of the point that the principal ray passes through.

8. A calibration device according to claim 6, wherein the calculating of the parameters obtains data representing the direction of world coordinates in the calibration data in relation to the coordinates of the point that the principal ray passes through, obtained according to the camera model from the pixel coordinates in the calibration data, and fits a model representing the direction of the principal ray as a function of the pixel coordinates to the data, thereby updating parameters of the model.

9. A calibration device according to claim 1, wherein, when the projective relationship between the angle of view $\theta$ and the image height y is substantially expressed by $y=fP(\theta)$ using the focal length f of projection, the calculating of the parameters transforms three-dimensional world coordinates (x, y, z) in the calibration data obtained into three-dimensional coordinates $(rP(\theta)\cos \varphi, rP(\theta)\sin \varphi, r)$ on the basis of three-dimensional spherical coordinates $(r, \theta, \varphi)$ that are equal to the world coordinates, and then fits a camera model representing a straight line in the transformed coordinate system as a function of the pixel coordinates.

10. A calibration device according to claim 9, wherein the calculating of the parameters fits a camera model representing the slope and the intercept of the straight line individually as two-dimensional functions of the pixel coordinates, the straight line being dictated by the slope thereof in relation to the r axis of the transformed coordinate system and the intercept thereof constituting the intersection with a plane perpendicular to the r axis.

11. A calibration device according to claim 2, wherein the function of the pixel coordinates has the same form as a function representing an image-forming relationship between two-dimensional planes.

12. A calibration device according to claim 11, wherein the function representing the image-forming relationship between the two-dimensional planes is represented by a linear sum of a plurality of two-dimensional vectors of the image coordinates.

13. A calibration device according to claim 9, wherein the calculating of the parameters sets, on the basis of parameters obtained by fitting the camera model representing the straight line in the transformed coordinates ($rP(\theta)\cos \varphi$, $rP(\theta)\sin \varphi$, $r$) as a function of the pixel coordinates, initial values of camera parameters of a camera model representing the direction of the principal ray and the coordinates of a point that the principal ray passes through individually as functions of the pixel coordinates, and that then iteratively optimizes the camera model, thereby calculating the parameters of the camera model.

14. A calibration device according to claim 1, wherein the calculating of the parameters fits the camera model to calibration data obtained by transforming three-dimensional world coordinates in the calibration data obtained into world coordinates rotated by one or more rotation angles among three rotation angles representing rotations of the world coordinates, thereby obtaining one or more rotation angles that minimize the residual of the camera model.

15. A calibration device according to claim 1, wherein the the calculating of the parameters fits the camera model to calibration data obtained by transforming three-dimensional world coordinates in the calibration data obtained into world coordinates translated by one or more components among three translation components representing translations of the world coordinates, thereby obtaining one or more translation components that minimize the residual of the camera model.

16. A calibration device according to claim 1,
wherein the optical device includes a plurality of image conversion elements and an optical system that forms an image-forming relationship between the image conversion elements and a three-dimensional world coordinate space,
wherein the obtaining of the calibration-data obtains the calibration data of the individual image conversion elements and the optical system, and
wherein the calculating of the parameters fits the camera models represented as functions of two-dimensional pixel coordinates of the individual image conversion elements to the calibration data of the individual image conversion elements and the optical system.

17. A calibration device according to claim 1,
wherein the optical device is a photographing device,
wherein the image conversion element is an image-capturing element, and
wherein the optical system is an image-capturing optical system.

18. A calibration device according to claim 1,
wherein the optical device is a projecting device,
wherein the image conversion element is an image-forming element, and
wherein the optical system is a projection optical system.

19. A calibration method comprising:
obtaining calibration data for an optical device including a two-dimensional image conversion element having a plurality of pixels and including an optical system that forms an image-forming relationship between the image conversion element and a three-dimensional world coordinate space, the calibration data representing the correspondence between two-dimensional pixel coordinates of the image conversion element and three-dimensional world coordinates of the world coordinate space; and
fitting, on the basis of the obtained calibration data, a camera model representing, as a function of the pixel coordinates, the direction of a principal ray in the world coordinate space, corresponding to the pixel coordinates, thereby calculating parameters of the camera model.

20. A measurement method comprising:
obtaining calibration data for a photographing device including a two-dimensional image conversion element having a plurality of pixels and including an optical system that forms an image-forming relationship between the image conversion element and a three-dimensional world coordinate space, the calibration data representing the correspondence between two-dimensional pixel coordinates of the image conversion element and three-dimensional world coordinates of the world coordinate space;
fitting, on the basis of the obtained calibration data, a camera model representing, as a function of the pixel coordinates, the direction of a principal ray in the world coordinate space, corresponding to the pixel coordinates, thereby calculating parameters of the camera model; and
calculating three-dimensional coordinates of a point of interest of an object from pixel coordinates of images from a plurality of viewpoints by using the calculated parameters, the camera model used to calculate the parameters, and rotation angles and/or translation components of the photographing device.

* * * * *